(12) United States Patent
Kato

(10) Patent No.: US 12,262,134 B2
(45) Date of Patent: Mar. 25, 2025

(54) SOLID-STATE IMAGING ELEMENT, IMAGING DEVICE, AND METHOD FOR CONTROLLING SOLID-STATE IMAGING ELEMENT

(71) Applicant: Sony Semiconductor Solutions Corporation, Kanagawa (JP)

(72) Inventor: Hiromu Kato, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 58 days.

(21) Appl. No.: 18/259,454

(22) PCT Filed: Dec. 16, 2021

(86) PCT No.: PCT/JP2021/046448
§ 371 (c)(1),
(2) Date: Jun. 27, 2023

(87) PCT Pub. No.: WO2022/172586
PCT Pub. Date: Aug. 18, 2022

(65) Prior Publication Data
US 2024/0064437 A1 Feb. 22, 2024

(30) Foreign Application Priority Data
Feb. 12, 2021 (JP) .................................. 2021-020362

(51) Int. Cl.
*H04N 25/772* (2023.01)
*H04N 25/767* (2023.01)
*H04N 25/778* (2023.01)

(52) U.S. Cl.
CPC ......... *H04N 25/772* (2023.01); *H04N 25/767* (2023.01); *H04N 25/778* (2023.01)

(58) Field of Classification Search
None
See application file for complete search history.

(56) References Cited

U.S. PATENT DOCUMENTS

2018/0184026 A1* 6/2018 Kato ...................... H04N 25/65

FOREIGN PATENT DOCUMENTS

| JP | 2008177760 A | 7/2008 |
|----|--------------|--------|
| JP | 2009177378 A | 8/2009 |

(Continued)

OTHER PUBLICATIONS

International Search Report (PCT/ISA/210), International Application No. PCT/JP2021/046448, dated Mar. 8, 2022.

*Primary Examiner* — Mark T Monk
(74) *Attorney, Agent, or Firm* — Michael Best & Friedrich LLP

(57) ABSTRACT

Provided is a solid-state imaging element provided with a sample-and-hold circuit, the solid-state imaging element improving the image quality of image data. A first pixel generates a predetermined first reset level and a first signal level according to an exposure amount. A second pixel generates a predetermined second reset level and a second signal level according to an exposure amount. A sample-and-hold circuit performs reset level sampling processing of causing a first individual capacitor to hold the first reset level and causing a second individual capacitor to hold the second reset level, and correlated double sampling processing of causing a common capacitor and the first individual capacitor to hold a first output level according to a difference between the first reset level and the first signal level and causing the common capacitor and the second individual capacitor to hold a second output level according to a difference between the second reset level and the second signal level.

10 Claims, 20 Drawing Sheets

(56) References Cited

FOREIGN PATENT DOCUMENTS

| JP | 2013183442 A | 9/2013 |
|----|--------------|--------|
| JP | 2019140635 A | 8/2019 |

* cited by examiner

FIG. 10
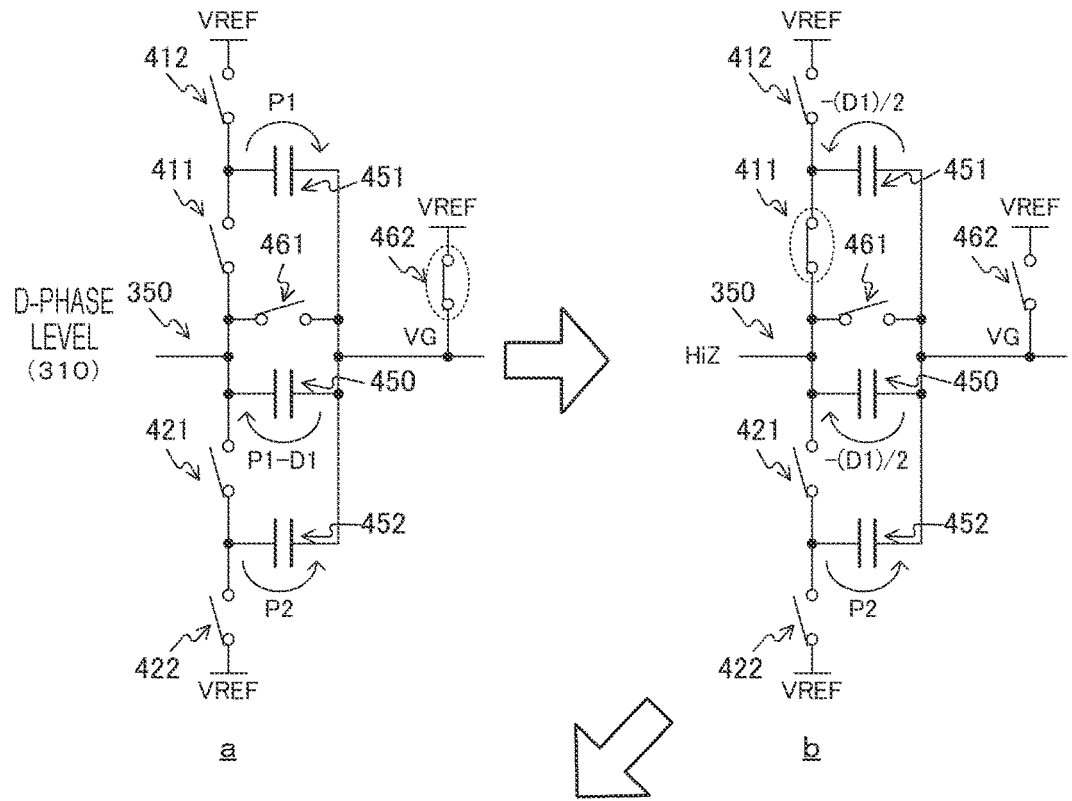
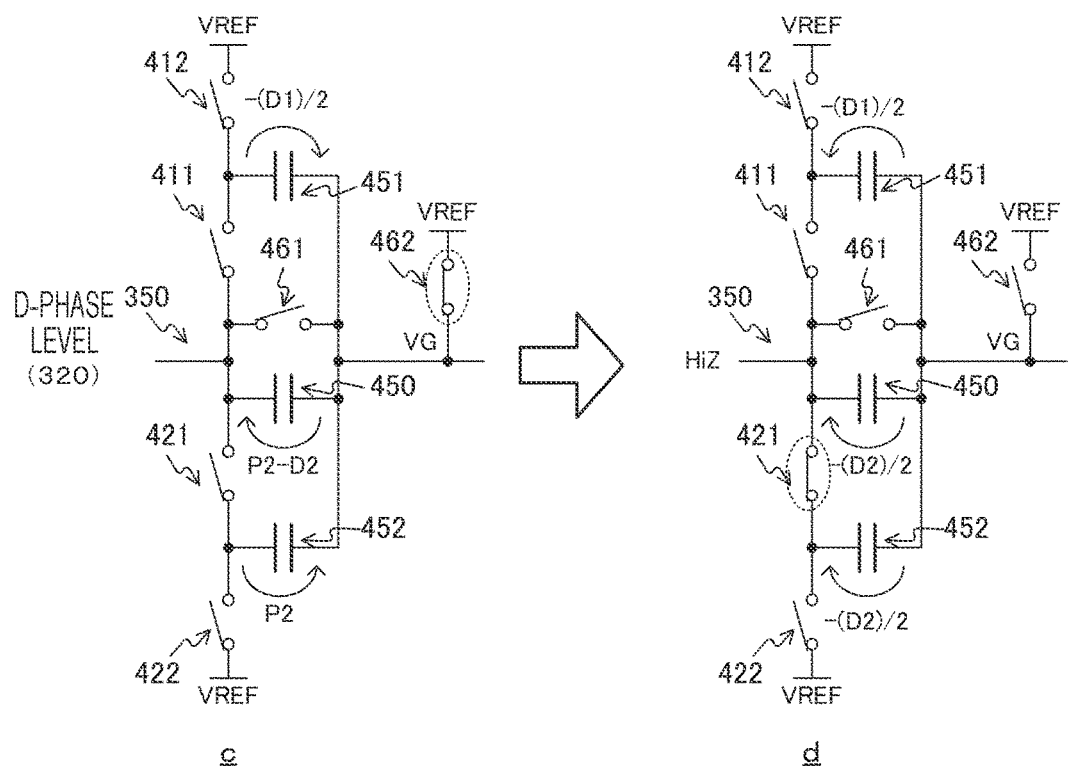

FIG. 12
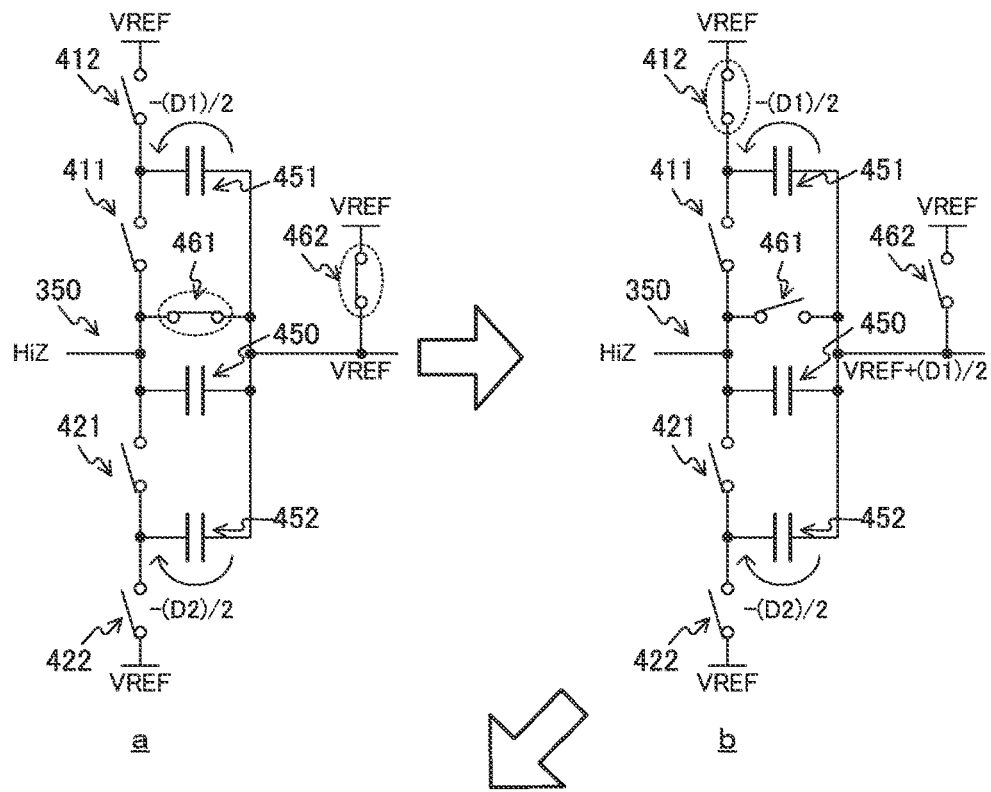
a    b
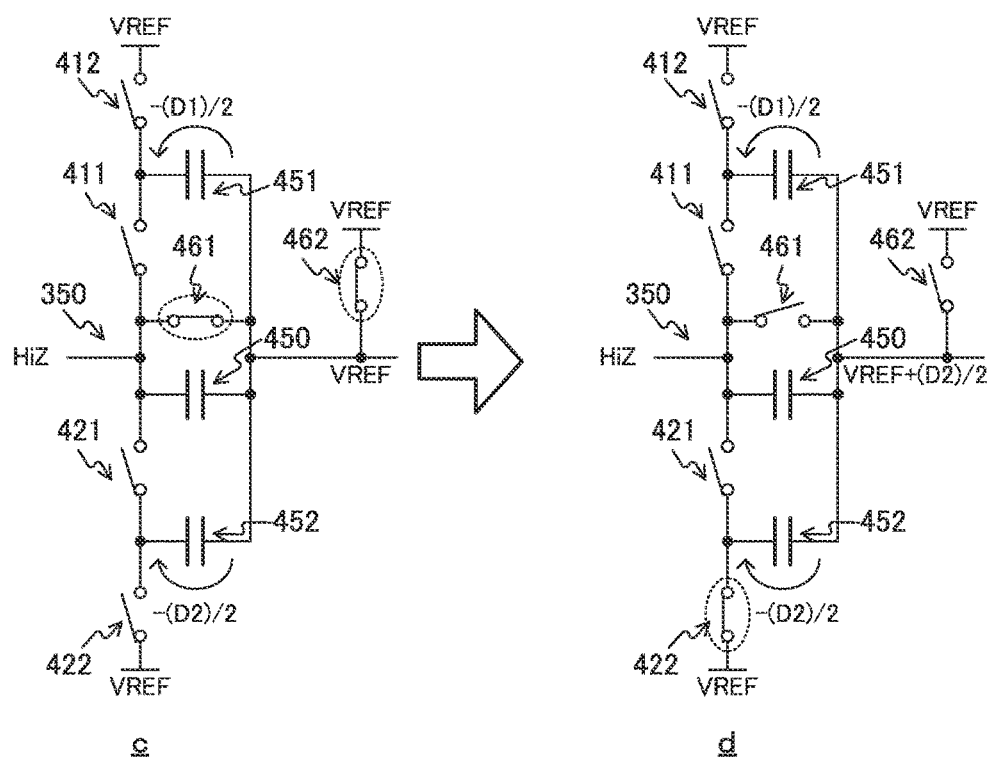
c    d

FIG. 19

| | SAMPLE-AND-HOLD CIRCUIT OF COMPARATIVE EXAMPLE | SAMPLE-AND-HOLD CIRCUIT 400 |
|---|---|---|
| NUMBER OF ELEMENTS IN S/H CIRCUIT | CAPACITOR: N+1<br>TRANSISTOR: 4N | CAPACITOR: N+1<br>TRANSISTOR: 2N+4 |
| NUMBER OF CONTROL SIGNALS OF S/H CIRCUIT | 3N | 2N+3 |
| SH TRANSMISSION GAIN | <0.5 | <0.5 |
| EXPOSURE PERIOD | MISMATCH OF START AND END TIMINGS | MATCH OF START AND END TIMINGS |
| VOLTAGE FLUCTUATION TOLERANCE IN LONG PERIOD | WEAK | STRONG |
| PDD READING | IMPOSSIBLE | POSSIBLE |

…

SOLID-STATE IMAGING ELEMENT, IMAGING DEVICE, AND METHOD FOR CONTROLLING SOLID-STATE IMAGING ELEMENT

TECHNICAL FIELD

The present technology relates to a solid-state imaging element. More specifically, the present technology relates to a solid-state imaging element that exposes all pixels simultaneously, an imaging device, and a method for controlling a solid-state imaging element.

BACKGROUND ART

Conventionally, in imaging devices and the like, a global shutter method of simultaneously exposing all pixels has been widely used in order to avoid rolling shutter distortion. When this global shutter method is used, a charge or voltage is held by a charge domain method or a voltage domain method. The former is a method in which a capacitor is provided in a pixel to hold a charge, and the latter is a method in which a sample-and-hold circuit is provided at a subsequent stage to the pixel to hold a voltage. When the latter voltage domain method is used, a solid-state imaging element in which a plurality of pixels shares one sample-and-hold circuit has been proposed (see, for example, Patent Document 1).

CITATION LIST

Patent Document

Patent Document 1: Japanese Patent Application Laid-Open No. 2013-183442

SUMMARY OF THE INVENTION

Problems to be Solved by the Invention

In the above-described conventional technology, a plurality of pixels shares one sample-and-hold circuit, thereby reducing the number of elements per pixel as compared with a case where a sample-and-hold circuit is provided for each pixel. However, in the above-described solid-state imaging element, it is not possible to completely match the exposure timings of the plurality of pixels sharing the sample-and-hold circuit. Furthermore, in the above-described solid-state imaging element, there is a possibility that photoresponse nonuniformity (PRNU) deteriorates when the voltage fluctuates between the time of shuttering and the time of reading. There is a problem that an image quality of image data is degraded due to the mismatch of the exposure timings and the deterioration of the PRNU.

The present technology has been made in view of such circumstances, and an object thereof is to improve an image quality of image data in a solid-state imaging element provided with a sample-and-hold circuit.

Solutions to Problems

The present technology has been made to solve the above-described problems, and a first aspect thereof is a solid-state imaging element and a method for controlling the same, the solid-state imaging element including: a first pixel that generates a predetermined first reset level and a first signal level according to an exposure amount; a second pixel that generates a predetermined second reset level and a second signal level according to an exposure amount; and a sample-and-hold circuit that performs reset level sampling processing and correlated double sampling processing, the reset level sampling processing causing a first individual capacitor to hold the first reset level and causing a second individual capacitor to hold the second reset level, the correlated double sampling processing causing a common capacitor and the first individual capacitor to hold a first output level according to a difference between the first reset level and the first signal level and causing the common capacitor and the second individual capacitor to hold a second output level according to a difference between the second reset level and the second signal level. This brings about an effect that an image quality of image data is improved.

Furthermore, in the first aspect, the sample-and-hold circuit may include: the first individual capacitor; the second individual capacitor; the common capacitor; a reset level sampling circuit that performs the reset level sampling processing; and a correlated double sampling circuit that performs the correlated double sampling processing. This brings about an effect that reset level sampling and correlated double sampling processing are performed.

Furthermore, in the first aspect, one ends of the first individual capacitor, the second individual capacitor, and the common capacitor may be commonly connected to a predetermined output-side node, another end of the common capacitor may be commonly connected to the first and second pixels, and the reset level sampling circuit may include: a first connection transistor that connects a node of a predetermined reference voltage to another end of the first individual capacitor; a second connection transistor that connects a node of the reference voltage to another end of the second individual capacitor; and a common short-circuit transistor that short-circuits both ends of the common capacitor. This brings about an effect that the first reset level and the second reset level are held.

Furthermore, in the first aspect, the correlated double sampling circuit may include: a common connection transistor that connects a node of the reference voltage to the output-side node; a first short-circuit transistor that short-circuits between the another end of the first individual capacitor and the another end of the common capacitor; and a second short-circuit transistor that short-circuits between the another end of the second individual capacitor and the another end of the common capacitor. This brings about an effect that analog correlated double sampling processing is performed.

Furthermore, in the first aspect, the solid-state imaging element may further include an analog-to-digital converter, and the sample-and-hold circuit may further perform, after the correlated double sampling processing, processing of sequentially outputting the reference voltage, a sum value of the reference voltage and the first output level, the reference voltage, and a sum value of the reference voltage and the second output level to the analog-to-digital converter. This brings about an effect that signal reading is performed.

Furthermore, in the first aspect, the analog-to-digital converter may sequentially convert the reference voltage, a sum value of the reference voltage and the first output level, the reference voltage, and a sum value of the reference voltage and the second output level into a digital signal. This brings about an effect that signal reading is performed.

Furthermore, in the first aspect, the analog-to-digital converter may sequentially convert the reference voltage, a sum value of the reference voltage and the first output level, and a sum value of the reference voltage and the second output level into a digital signal. This brings about an effect that a reading speed is increased.

Furthermore, in the first aspect, the solid-state imaging element may further include: a third pixel that generates a predetermined third reset level and a third signal level according to an exposure amount; and a fourth pixel that generates a predetermined fourth reset level and a fourth signal level according to an exposure amount, and the sample-and-hold circuit may cause a third individual capacitor to hold the third reset level and cause a fourth individual capacitor to hold the fourth reset level in the reset level sampling processing, and cause the common capacitor and the third individual capacitor to hold a third output level according to a difference between the third reset level and the fourth signal level and cause the common capacitor and the fourth individual capacitor to hold a fourth output level according to a difference between the fourth reset level and the fourth signal level in the correlated double sampling processing. This brings about an effect that the number of elements per pixel is reduced.

Furthermore, a second aspect of the present technology is an imaging device including: a first pixel that generates a predetermined first reset level and a first signal level according to an exposure amount; a second pixel that generates a predetermined second reset level and a second signal level according to an exposure amount; a sample-and-hold circuit that performs reset level sampling processing and correlated double sampling processing, the reset level sampling processing causing a first individual capacitor to hold the first reset level and causing a second individual capacitor to hold the second reset level, the correlated double sampling processing causing a common capacitor and the first individual capacitor to hold a first output level according to a difference between the first reset level and the first signal level and causing the common capacitor and the second individual capacitor to hold a second output level according to a difference between the second reset level and the second signal level; and a column signal processing circuit that converts a level output from the sample-and-hold circuit into a digital signal. This brings about an effect that an image quality of image data of an imaging device is improved.

BRIEF DESCRIPTION OF DRAWINGS

FIG. 10 is a diagram for describing an operation of analog CDS in the first embodiment of the present technology.

FIG. 12 is a diagram for describing an operation of the sample-and-hold circuit at the time of reading in the first embodiment of the present technology.

FIG. 19 is a diagram for describing features of the comparative example and the sample-and-hold circuit in the embodiment of the present technology.

MODE FOR CARRYING OUT THE INVENTION

Modes for carrying out the present technology (hereinafter referred to as embodiments) are hereinafter described. The description will be given in the following order.
1. First Embodiment (Example in Which Levels Are Held in Three capacitors)
2. Second Embodiment (Example in Which Levels Are held in Three Capacitors and Reading of Reference Voltage Is Omitted)
3. Third Embodiment (Example in Which Sample-and-Hold Circuit That Holds Levels in Three Capacitors Is Shared by Four Pixels)
4. Example of Application to Mobile Body 1. First Embodiment

[Configuration Example of Imaging Device]

Figure 1:
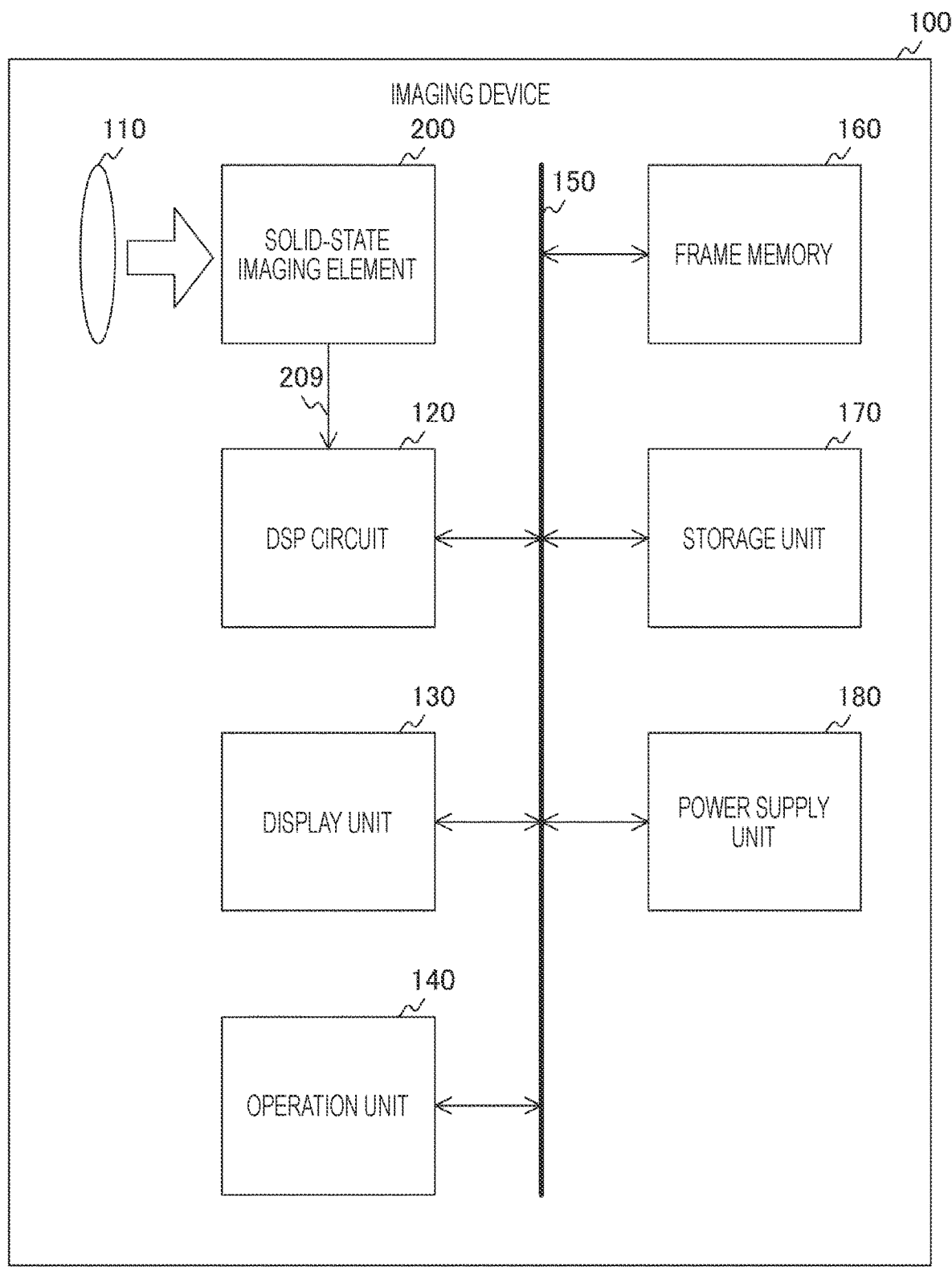
FIG. 1 is a block diagram illustrating a configuration example of an imaging device in a first embodiment of the present technology.

FIG. 1 is a block diagram illustrating a configuration example of an imaging device 100 in a first embodiment of the present technology. The imaging device 100 is a device for capturing image data (frame), and includes an optical unit 110, a solid-state imaging element 200, and a digital signal processing (DSP) circuit 120. The imaging device 100 further includes a display unit 130, an operation unit 140, a bus 150, a frame memory 160, a storage unit 170, and a power supply unit 180. As the imaging device 100, for example, in addition to a digital camera such as a digital still camera, a smartphone and a personal computer having an imaging function, an in-vehicle camera, and the like are assumed.

The optical unit 110 condenses light from a subject and guides the light to the solid-state imaging element 200. The solid-state imaging element 200 generates a frame by photoelectric conversion in synchronization with a vertical synchronization signal. Here, the vertical synchronization signal is a periodic signal of a predetermined frequency indicating imaging timing. The solid-state imaging element 200 supplies the generated image data to the DSP circuit 120 via a signal line 209.

The DSP circuit 120 executes predetermined signal processing on the frame from the solid-state imaging element 200. The DSP circuit 120 outputs the processed frame to the frame memory 160 and the like via the bus 150.

The display unit 130 displays frames. As the display unit 130, for example, a liquid crystal panel or an organic electro luminescence (EL) panel is assumed. The operation unit 140 generates an operation signal according to a user's operation.

The bus 150 is a common path through which the optical unit 110, the solid-state imaging element 200, the DSP circuit 120, the display unit 130, the operation unit 140, the frame memory 160, the storage unit 170, and the power supply unit 180 exchange data with each other.

The frame memory 160 holds image data. The storage unit 170 stores various data such as frames. The power supply unit 180 supplies power to the solid-state imaging element 200, the DSP circuit 120, the display unit 130 and the like.

[Configuration Example of Solid-State Imaging Element]

Figure 2:
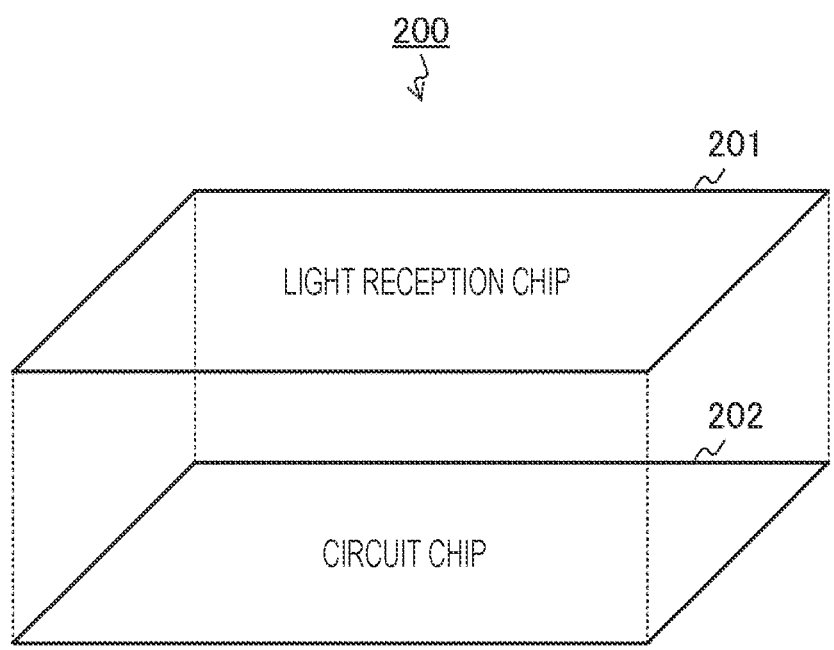
FIG. 2 is a view illustrating an example of a stacked structure in the first embodiment of the present technology.

FIG. 2 is a view illustrating an example of a stacked structure of the solid-state imaging element 200 in the first embodiment of the present technology. The solid-state imaging element 200 includes a circuit chip 202 and a light reception chip 201 stacked on the circuit chip 202. These chips are connected by Cu—Cu bonding, vias, or bumps.

Figure 3:
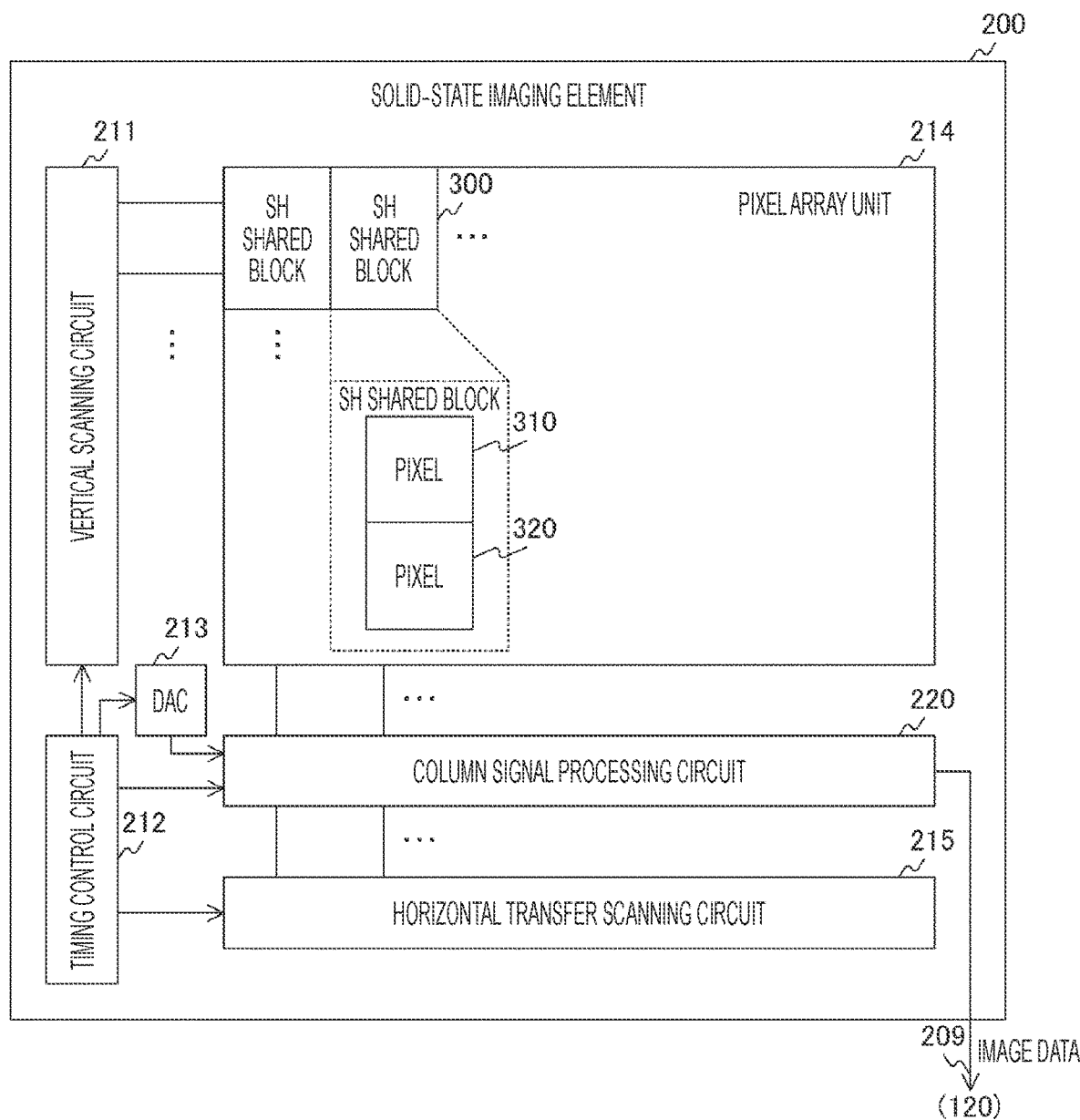
FIG. 3 is a block diagram illustrating a configuration example of a solid-state imaging element in the first embodiment of the present technology.

FIG. 3 is a block diagram illustrating a configuration example of the solid-state imaging element 200 in the first embodiment of the present technology. The solid-state imaging element 200 includes a vertical scanning circuit 211, a timing control circuit 212, a digital to analog converter (DAC) 213, a pixel array unit 214, a column signal processing circuit 220, and a horizontal transfer scanning circuit 215.

In the pixel array unit 214, a plurality of pixels is arranged in a two-dimensional grid pattern. Furthermore, two adjacent pixels (for example, two pixels arranged in the vertical direction) in the pixel array unit 214 share one sample-and-hold circuit. The sample-and-hold circuit is omitted in the drawing. A circuit including the sample-and-hold circuit and two pixels (such as the pixel 310 and the pixel 320) sharing the circuit is referred to as an SH shared block 300.

The pixel (such as the pixel 310) photoelectrically converts incident light to generate an analog pixel signal.

The vertical scanning circuit 211 drives a pixel and outputs a pixel signal to the column signal processing circuit 220. The timing control circuit 212 controls operation timings of the vertical scanning circuit 211, the DAC 213, the column signal processing circuit 220, and the horizontal transfer scanning circuit 215 in synchronization with the vertical synchronization signal.

The DAC 213 generates a predetermined reference signal and supplies the generated reference signal to the column signal processing circuit 220. For example, a sawtooth-shaped ramp signal is used as the reference signal.

The column signal processing circuit 220 includes an ADC for each column of the SH shared block 300, and performs analog to digital (AD) conversion on an analog signal of each column. The column signal processing circuit 220 sequentially outputs the AD-converted digital signals to the DSP circuit 120 under the control of the horizontal transfer scanning circuit 215. For each row of the SH shared block 300, AD conversion is executed for each column in the row. One piece of image data is generated by executing the AD conversion on all the rows.

The horizontal transfer scanning circuit 215 controls the column signal processing circuit 220 to sequentially output the digital signals to the DSP circuit 120.

[Configuration Example of SH Shared Block]

Figure 4:
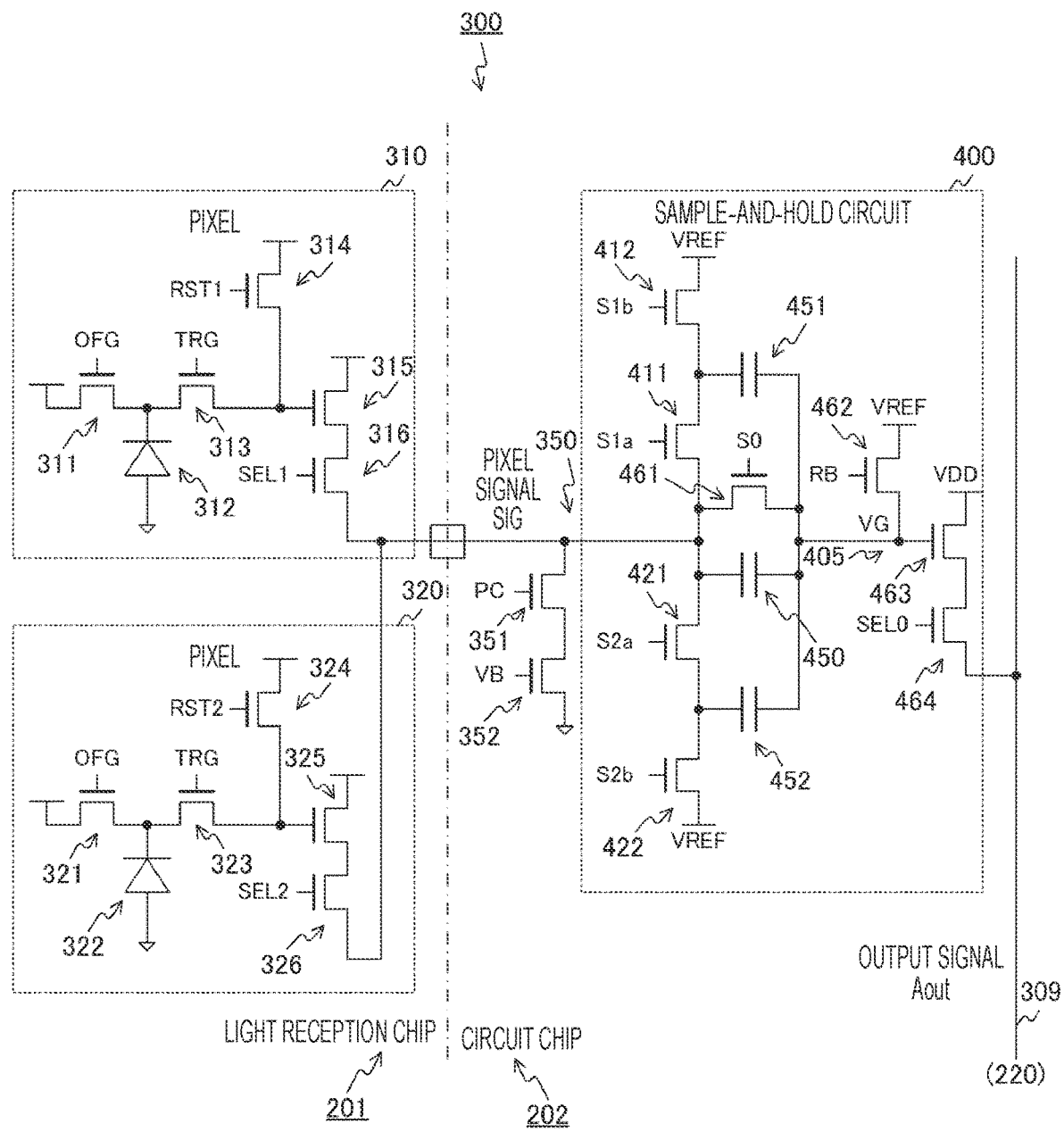
FIG. 4 is a circuit diagram illustrating a configuration example of an SH shared block in the first embodiment of the present technology.

FIG. 4 is a circuit diagram illustrating a configuration example of the SH shared block 300 in the first embodiment of the present technology. The SH shared block 300 includes pixels 310 and 320, a connection transistor 351, a load metal-oxide-semiconductor (MOS) transistor 352, and a sample-and-hold circuit 400. Furthermore, in the pixel array unit 214, a vertical signal line 309 is wired for each column of the SH shared block 300. As the connection transistor 351 and the load MOS transistor 352, for example, n-channel MOS (nMOS) transistors are used.

The pixels 310 and 320 are disposed, for example, on the light reception chip 201, and a circuit (such as the sample-and-hold circuit 400) at a subsequent stage thereof is disposed on the circuit chip 202. Note that the pixel 310 is an example of a first pixel described in the claims, and the pixel 320 is an example of a second pixel described in the claims.

The pixel 310 includes a charge discharge transistor 311, a photoelectric conversion element 312, a transfer transistor 313, a reset transistor 314, an amplification transistor 315, and a selection transistor 316. The pixel 320 includes a charge discharge transistor 321, a photoelectric conversion element 322, a transfer transistor 323, a reset transistor 324, an amplification transistor 325, and a selection transistor 326. As transistors in these pixels, for example, nMOS transistors are used.

The charge discharge transistor 311 discharges the charge having overflowed from the photoelectric conversion element 312 to the power supply voltage according to a discharge control signal OFG from the vertical scanning circuit 211. The charge discharge transistor 321 discharges the charge having overflowed from the photoelectric conversion element 322 to the power supply voltage according to the discharge control signal OFG.

The photoelectric conversion element 312 converts incident light to the pixel 310 into a charge. The photoelectric conversion element 322 converts incident light to the pixel 320 into a charge.

The transfer transistor 313 transfers charge from the photoelectric conversion element 312 to a floating diffusion layer (not illustrated) according to a transfer signal TRG from the vertical scanning circuit 211. The transfer transistor 323 transfers charges from the photoelectric conversion element 322 to a floating diffusion layer (not illustrated) according to the control signal TRG.

The reset transistor 314 initializes the floating diffusion layer according to a reset signal RST1 from the vertical scanning circuit 211. The reset transistor 324 initializes the floating diffusion layer according to a reset signal RST2 from the vertical scanning circuit 211.

The amplification transistor 315 amplifies the voltage of the floating diffusion layer. The amplification transistor 325 amplifies a voltage of the floating diffusion layer.

The selection transistor 316 outputs a signal of the amplified voltage to an input node 350 as a pixel signal SIG according to a selection signal SEL1 from the vertical scanning circuit 211. The selection transistor 326 outputs a signal of the amplified voltage to the input node 350 as the pixel signal SIG according to a selection signal SEL2 from the vertical scanning circuit 211.

A predetermined bias voltage VB is applied to the gate of the load MOS transistor 352. The load MOS transistor 352 supplies a load current corresponding to the bias voltage.

The connection transistor 351 opens and closes a path between the load MOS transistor 352 and the input node 350 according to a control signal PC from the vertical scanning circuit 211.

The sample-and-hold circuit 400 includes short-circuit transistors 411, 421, and 461, connection transistors 412, 422, and 462, a common capacitor 450, individual capacitors 451 and 452, an amplification transistor 463, and a selection transistor 464. As transistors in the sample-and-hold circuit 400, for example, nMOS transistors are used.

For example, MIM elements are used as the common capacitor 450, the individual capacitor 451, and the individual capacitor 452. The capacitance values of these capacitors are assumed to be the same. Also, one end (right side in the drawing) of each of these three capacitors is connected to an output-side node 405. The voltage of the output-side node 405 is defined as VG. Also, the other end of the common capacitor 450 is connected to the input node 350.

The short-circuit transistor 411 opens and closes a path between the other end (left side in the drawing) of the individual capacitor 451 and the input node 350 according to a control signal S1a from the vertical scanning circuit 211. The short-circuit transistor 421 opens and closes a path between the other end (left side in the drawing) of the individual capacitor 452 and the input node 350 according to a control signal S2a from the vertical scanning circuit 211.

The connection transistor 412 opens and closes a path between a node of a reference voltage VREF and the other end of the individual capacitor 451 according to a control signal S1b from the vertical scanning circuit 211. The connection transistor 422 opens and closes a path between a node of a reference voltage VREF and the other end of the individual capacitor 452 according to a control signal S2b from the vertical scanning circuit 211.

The short-circuit transistor 461 opens and closes a path between one end and the other end of the common capacitor 450 according to a control signal S0 from the vertical scanning circuit 211. The connection transistor 462 opens and closes a path between a node of a reference voltage VREF and the output-side node 405 according to a control signal RB from the vertical scanning circuit 211.

The amplification transistor 463 amplifies a voltage VG of the output-side node 405. The selection transistor 464 outputs a signal of the voltage amplified by the amplification transistor 463 to the vertical signal line 309 according to a control signal SEL0 from the vertical scanning circuit 211. The signal of the vertical signal line 309 is supplied to the column signal processing circuit 220 as an analog output signal Aout.

Details of the control timing of each of the above-described transistors will be described later. Note that the power supply voltage of the pixels 310 and 320 and the power supply voltage of the sample-and-hold circuit 400 may be the same or different. Furthermore, a control signal to the sample-and-hold circuit 400 can be supplied from the timing control circuit 212 instead of the vertical scanning circuit 211.

Figure 5:
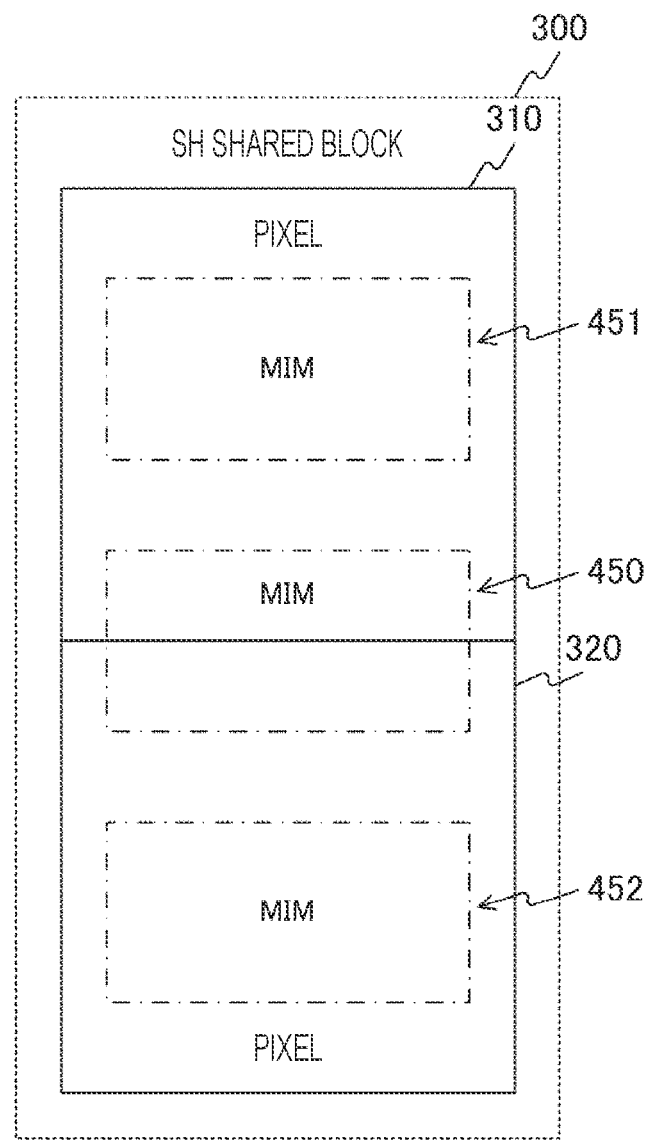
FIG. 5 is a diagram illustrating an arrangement example of metal insulator metal (MIM) elements in the first embodiment of the present technology.

FIG. 5 is a diagram illustrating an arrangement example of MIM elements in the first embodiment of the present technology. As described above, in the SH shared block 300, for example, three MIM elements are disposed as the common capacitor 450, the individual capacitor 451, and the individual capacitor 452. With the circuit chip 202 as a lower chip, the individual capacitor 451 is disposed immediately below the corresponding pixel 310, and the individual capacitor 452 is disposed immediately below the corresponding pixel 320. Further, the common capacitor 450 is disposed between the individual capacitors 451 and 452.

[Configuration Example of Column Signal Processing Circuit]

Figure 6:
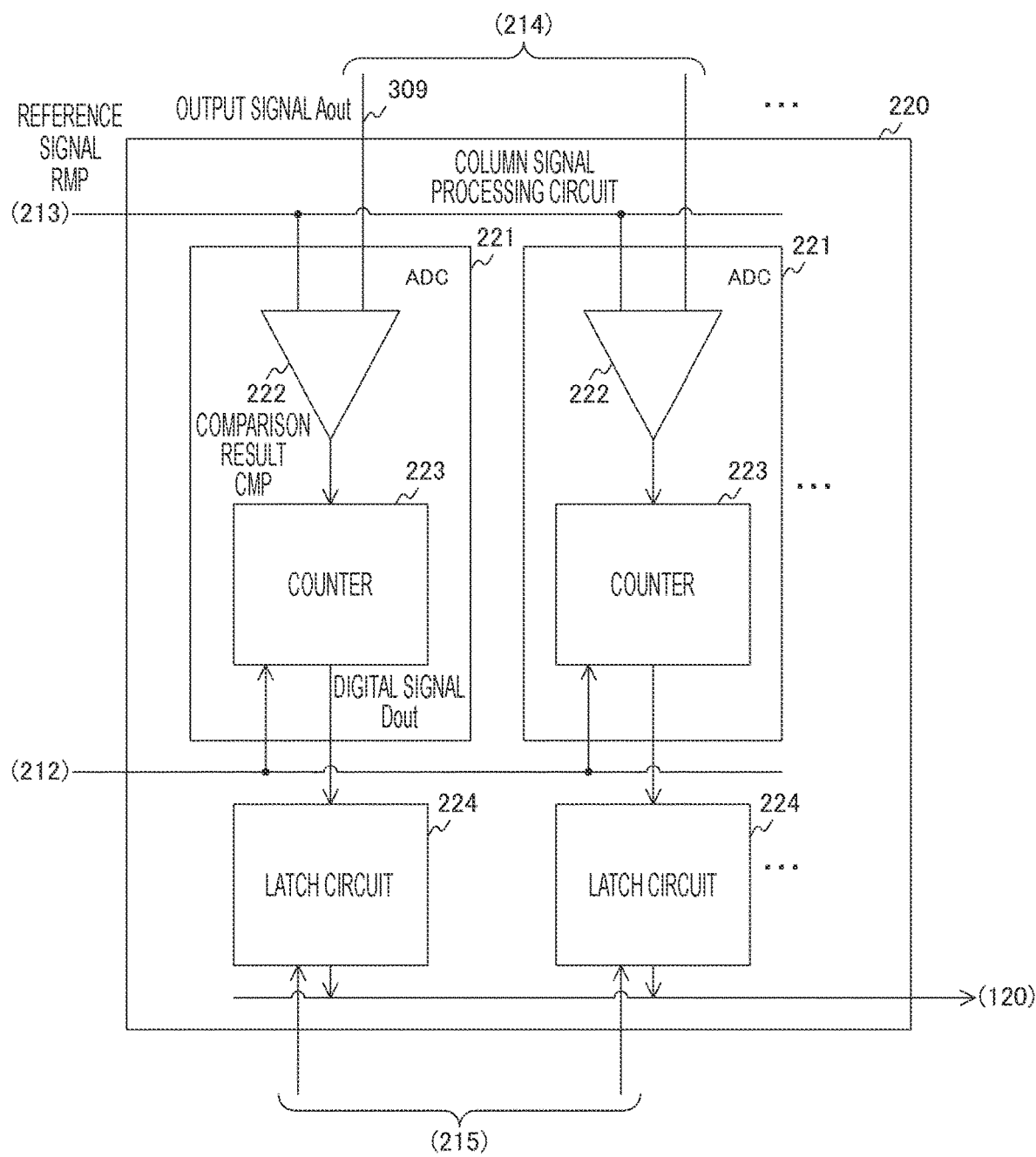
FIG. 6 is a block diagram illustrating a configuration example of a column signal processing circuit in the first embodiment of the present technology.

FIG. 6 is a block diagram illustrating a configuration example of the column signal processing circuit 220 in the first embodiment of the present technology. In the column signal processing circuit 220, an ADC 221 and a latch circuit 224 are disposed for each column of the SH shared block 300.

The ADC 221 converts the analog output signal Aout from the corresponding column into a digital signal Dout. This AD conversion is also called "reading" of the analog signal. The ADC 221 is, for example, a single-slope ADC, and includes a comparator 222 and a counter 223. Note that the ADC 221 is not limited to a single-slope type. For example, a successive approximation register analog to digital converter (SARADC) can be used as the ADC 221.

The comparator 222 compares a reference signal RMP from the DAC 213 with the output signal Aout. The comparator 222 supplies a comparison result CMP to the counter 223.

The counter 223 counts a count value over a period until the comparison result CMP is inverted. The counter 223 outputs a digital signal Dout indicating the count value to the latch circuit 224. In addition, the counter 223 can perform either up counting or down counting, and can switch from one of up counting and down counting to the other under the control of the timing control circuit 212.

The latch circuit 224 holds the digital signal Dout and outputs it under the control of the horizontal transfer scanning circuit 215.

[Operation Example of Solid-State Imaging Element]

Figure 7:
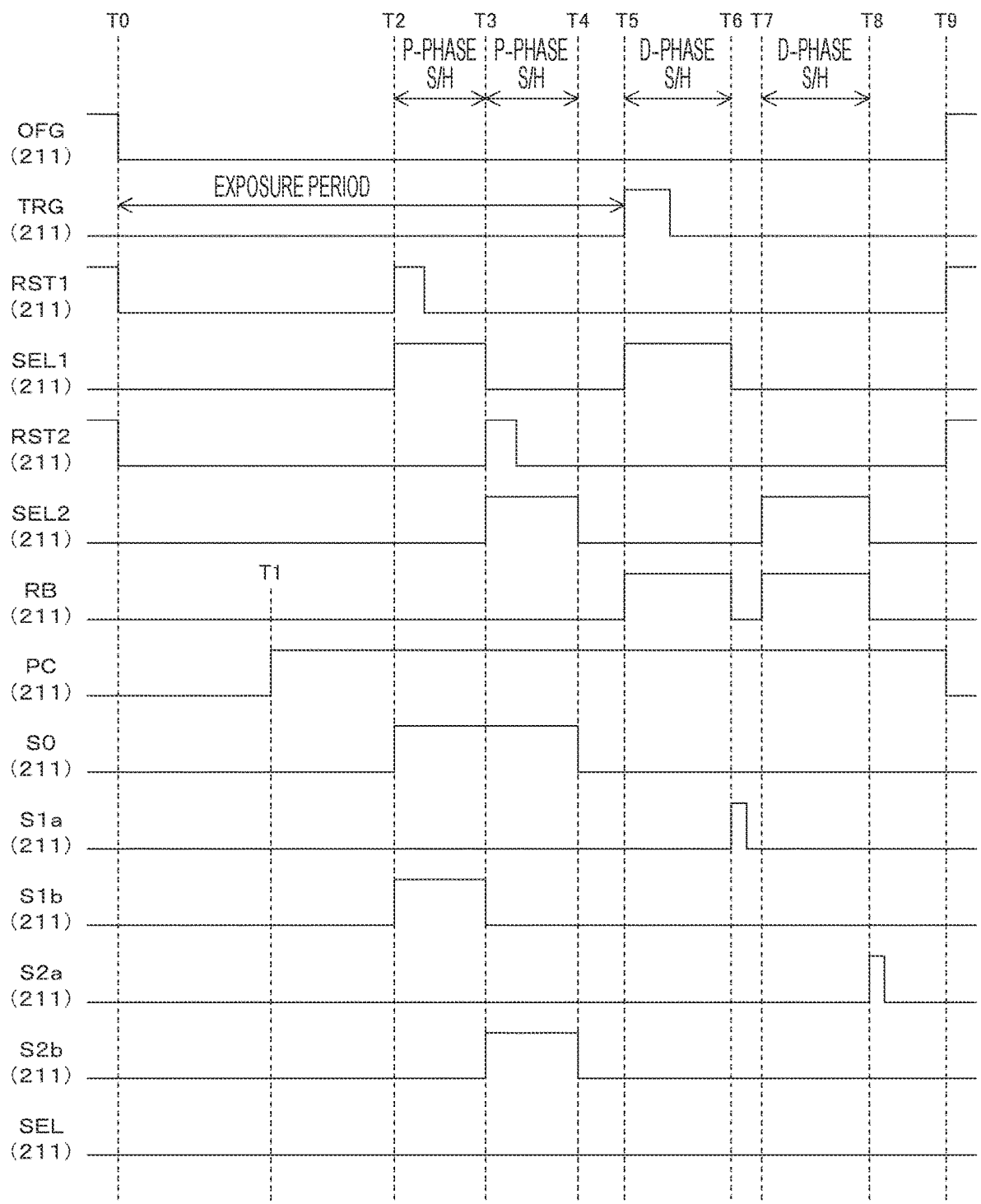
FIG. 7 is a timing chart illustrating an example of an operation of the solid-state imaging element from exposure to analog correlated double sampling (CDS) in the first embodiment of the present technology.

FIG. 7 is a timing chart illustrating an example of an operation of the solid-state imaging element from exposure to analog CDS in the first embodiment of the present technology. The vertical scanning circuit 211 sets the discharge control signal OFG and the reset signals RST1 and RST2 to the high level over a predetermined period. Timing T0 when the period has elapsed corresponds to the start timing of the exposure period.

At timing T1 before the lapse of the exposure period, the vertical scanning circuit 211 sets the control signal PC to the high level.

Then, the vertical scanning circuit 211 sets the reset signal RST1 to the high level over the pulse period from timing T2 immediately before the end of the exposure period. Thereby, a floating diffusion layer of the pixel 310 is initialized. The level of the pixel signal SIG at the time of this initialization is hereinafter referred to as a "P-phase level". The P-phase level can also be referred to as a reset level.

Furthermore, the vertical scanning circuit 211 sets the selection signal SEL1 and the control signals S0 and S1b to the high level over the period from timing T2 to timing T3. During this period, the P-phase level of the pixel 310 is sampled and held.

Then, the vertical scanning circuit 211 sets the reset signal RST2 to the high level over the pulse period from timing T3. Furthermore, the vertical scanning circuit 211 sets the selection signal SEL2 and the control signals S0 and S2b to the high level over the period from timing T3 to timing T4. During this period, the P-phase level of the pixel 320 is sampled and held.

Then, the vertical scanning circuit 211 sets the transfer signal TRG to the high level over the pulse period from timing T5. Accordingly, an amount of charge corresponding to the exposure amount is transferred to the floating diffusion layer. The level of the pixel signal SIG at the time of this transfer is hereinafter referred to as a "D-phase level". The D-phase level can also be referred to as a signal level. Further, timing T5 corresponds to the end timing of the exposure period.

Furthermore, the vertical scanning circuit 211 sets the selection signal SEL1 and the control signal RB to the high level over the period of timing T5 to timing T6. During this period, the D-phase level of the pixel 310 is sampled and held.

Then, the vertical scanning circuit 211 sets the control signal S1a to the high level over the pulse period from timing T6. During this period, analog CDS for obtaining a difference between the P-phase level and the D-phase level of the pixel 310 is performed.

Furthermore, the vertical scanning circuit 211 sets the selection signal SEL2 and the control signal RB to the high level over the period of timing T7 to timing T8. During this period, the D-phase level of the pixel 320 is sampled and held.

Then, the vertical scanning circuit 211 sets the control signal S2a to the high level over the pulse period from timing T8. During this period, analog CDS for obtaining a difference between the P-phase level and the D-phase level of the pixel 320 is performed.

Then, at timing T9, the vertical scanning circuit 211 sets the discharge control signal OFG, the reset signals RST1 and RST2 to the high level, and sets the control signal PC to the low level.

The control illustrated in the drawing is simultaneously performed on all the pixels. That is, exposure is performed by the global shutter method. In this global shutter method, timings of start and end of exposure of all pixels are completely matched.

Figure 8:
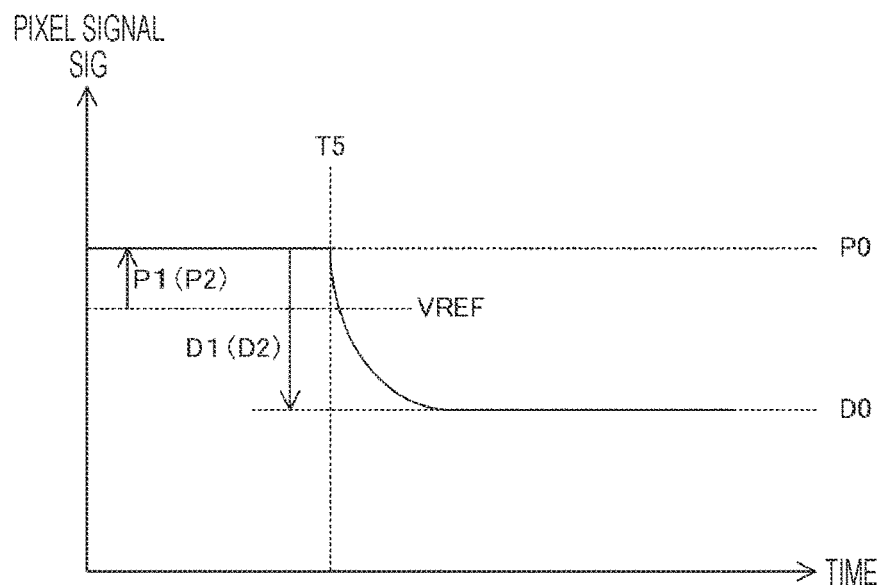
FIG. 8 is a diagram illustrating an example of variations of a pixel signal in the first embodiment of the present technology.

FIG. 8 is a diagram illustrating an example of variations of the pixel signal SIG in the first embodiment of the present technology. In the drawing, the vertical axis represents the level of the pixel signal SIG, and the horizontal axis represents time. Immediately before timing T5 at which the exposure period ends, the pixel signal SIG becomes "P0". The reference voltage VREF in the sample-and-hold circuit 400 is set to a value lower than P0. A difference between the reference voltage VREF and P0 is defined as "P1". This P1 represents a P-phase level when the reference voltage VREF is used as a reference. In addition, P0 represents a P-phase level when a ground voltage or the like in the pixel is used as a reference.

After timing T5, the pixel signal SIG decreases according to the exposure amount and becomes "D0". A difference between P0 and D0 is defined as "D1". This D1 is the net D-phase level obtained by analog CDS. The difference between P1 and D1 represents the D-phase level before analog CDS when the reference voltage VREF is used as a reference. In addition, D0 represents a D-phase level before analog CDS when the ground voltage or the like is used as a reference.

In summary, in a case where the reference voltage VREF is used as a reference, "P1" corresponds to the P-phase level of the pixel 310, and "P1-D1" corresponds to the D-phase level before analog CDS. Also, "D1" corresponds to the net D-phase level after analog CDS. Furthermore, the P-phase level of the pixel 320 and the D-phase levels before and after CDS are "P2", "P2-D2", and "D2".

Figure 9:
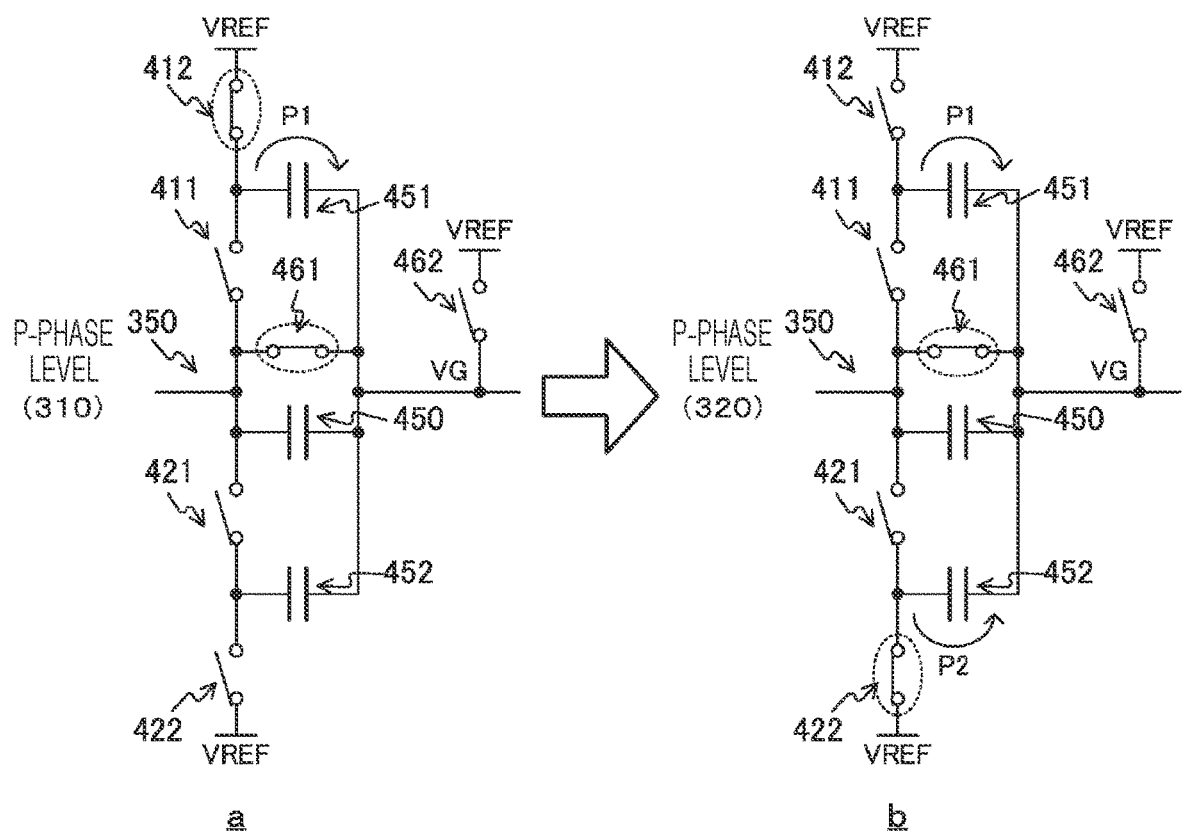
FIG. 9 is a diagram for describing an operation of a sample-and-hold circuit immediately before exposure ends in the first embodiment of the present technology.

FIG. 9 is a diagram for describing an operation of the sample-and-hold circuit 400 immediately before exposure ends in the first embodiment of the present technology. In the drawing, the transistor is represented by a symbol of a switch, and the amplification transistor 463 and the selection transistor 464 are omitted. An arrow in the drawing indicates the direction of the potential when the reference voltage VREF is used as a reference.

As illustrated in a of the drawing, when the P-phase level of the pixel 310 is input to the input node 350, the connection transistor 412 shifts to a closed state, and the reference voltage VREF is connected to a terminal on the input side of the individual capacitor 451. In addition, the short-circuit transistor 461 shifts to the closed state, and both ends of the common capacitor 450 are short-circuited. As a result, the P-phase level "P1" of the pixel 310 based on the reference voltage VREF is held in the individual capacitor 451.

Then, as illustrated in b of the drawing, when the P-phase level of the pixel 320 is input to the input node 350, the connection transistor 422 shifts to the closed state, and the reference voltage VREF is connected to a terminal on the input side of the individual capacitor 452. In addition, the short-circuit transistor 461 shifts to the closed state, and both ends of the common capacitor 450 are short-circuited. As a result, the P-phase level "P2" of the pixel 320 based on the reference voltage VREF is held in the individual capacitor 452.

As illustrated in the drawing, the sample-and-hold circuit 400 holds the P-phase level "P1" in the individual capacitor 451 and holds the P-phase level "P2" in the individual capacitor 452.

Note that the P-phase level "P1" is an example of a first reset level described in the claims, and the P-phase level "P2" is an example of a second reset level described in the claims. Further, the circuit including the connection transistors 412 and 422 and the short-circuit transistor 461 is an example of a reset level sampling circuit described in the claims. The connection transistor 412 is an example of a first connection transistor described in the claims, and the connection transistor 422 is an example of a second connection transistor described in the claims. The short-circuit transistor 461 is an example of a common short-circuit transistor described in the claims.

Furthermore, the operation illustrated in the drawing is performed during the period from timing T2 to timing T4 in FIG. 7.

FIG. 10 is a diagram for describing an operation of analog CDS in the first embodiment of the present technology. In the drawing, the transistor is represented by a symbol of a switch, and the amplification transistor 463 and the selection transistor 464 are omitted. An arrow in the drawing indicates the direction of the potential when the reference voltage VREF is used as a reference.

As illustrated in a of the drawing, when the D-phase level of the pixel 310 is input to the input node 350, the connection transistor 462 shifts to the closed state, and the node of the reference voltage VREF is connected to a terminal on the output side of the common capacitor 450. As a result, the D-phase level "P1-D1" before analog CDS is held in the common capacitor 450.

Then, as illustrated in b of the drawing, after the connection transistor 462 shifts to an open state, the short-circuit transistor 411 shifts to the closed state, and the terminal on the input side of the individual capacitor 451 and a terminal on the input side of the common capacitor 450 are short-circuited. The potentials held in the individual capacitor 451 and the common capacitor 450 immediately before are opposite in direction. For this reason, "P1" is canceled, and "−(D1)/2" is held in each of the capacitors. The absolute value of "−(D1)/2" is a level corresponding to the difference "D1" between the P-phase level and the D-phase level. The processing of obtaining the difference between the P-phase level and the D-phase level in this manner is called analog CDS.

Next, as illustrated in c of the drawing, when the D-phase level of the pixel 320 is input to the input node 350, the connection transistor 462 shifts to the closed state, and the node of the reference voltage VREF is connected to the terminal on the output side of the common capacitor 450. As a result, the D-phase level "P2-D2" before analog CDS is held in the common capacitor 450.

Then, as illustrated in d of the drawing, after the connection transistor 462 shifts to the open state, the short-circuit transistor 421 shifts to the closed state, and the terminal on the input side of the individual capacitor 452 and the terminal on the input side of the common capacitor 450 are short-circuited. The potentials held in the individual capacitor 452 and the common capacitor 450 immediately before are opposite in direction. For this reason, "P2" is canceled, and "−(D2)/2" is held in each of the capacitors. The absolute value of "−(D2)/2" is a level corresponding to the difference "D2" between the P-phase level and the D-phase level.

As illustrated in the drawing, the sample-and-hold circuit 400 performs analog CDS processing of holding "−(D1)/2" according to the difference between the P-phase level and the D-phase level of the pixel 310 in the common capacitor 450 and the individual capacitor 451. Furthermore, the sample-and-hold circuit 400 performs analog CDS processing of holding "−(D2)/2" according to the difference between the P-phase level and the D-phase level of the pixel 320 in the common capacitor 450 and the individual capacitor 451.

Note that the D-phase level "P1-D1" is an example of a first signal level described in the claims, and the D-phase level "P2-D2" is an example of a second signal level described in the claims. In addition, the circuit including the connection transistor 462 and the short-circuit transistors 411 and 421 is an example of a correlated double sampling circuit described in the claims. Also, the connection transistor 462 is an example of a common connection transistor described in the claims. The short-circuit transistor 411 is an example of a first short-circuit transistor described in the claims, and the short-circuit transistor 421 is an example of a second short-circuit transistor described in the claims.

In addition, the operation illustrated in the drawing is performed in a period between timing T5 in FIG. 7 and the time point when the pulse period has elapsed from timing T8.

Figure 11:
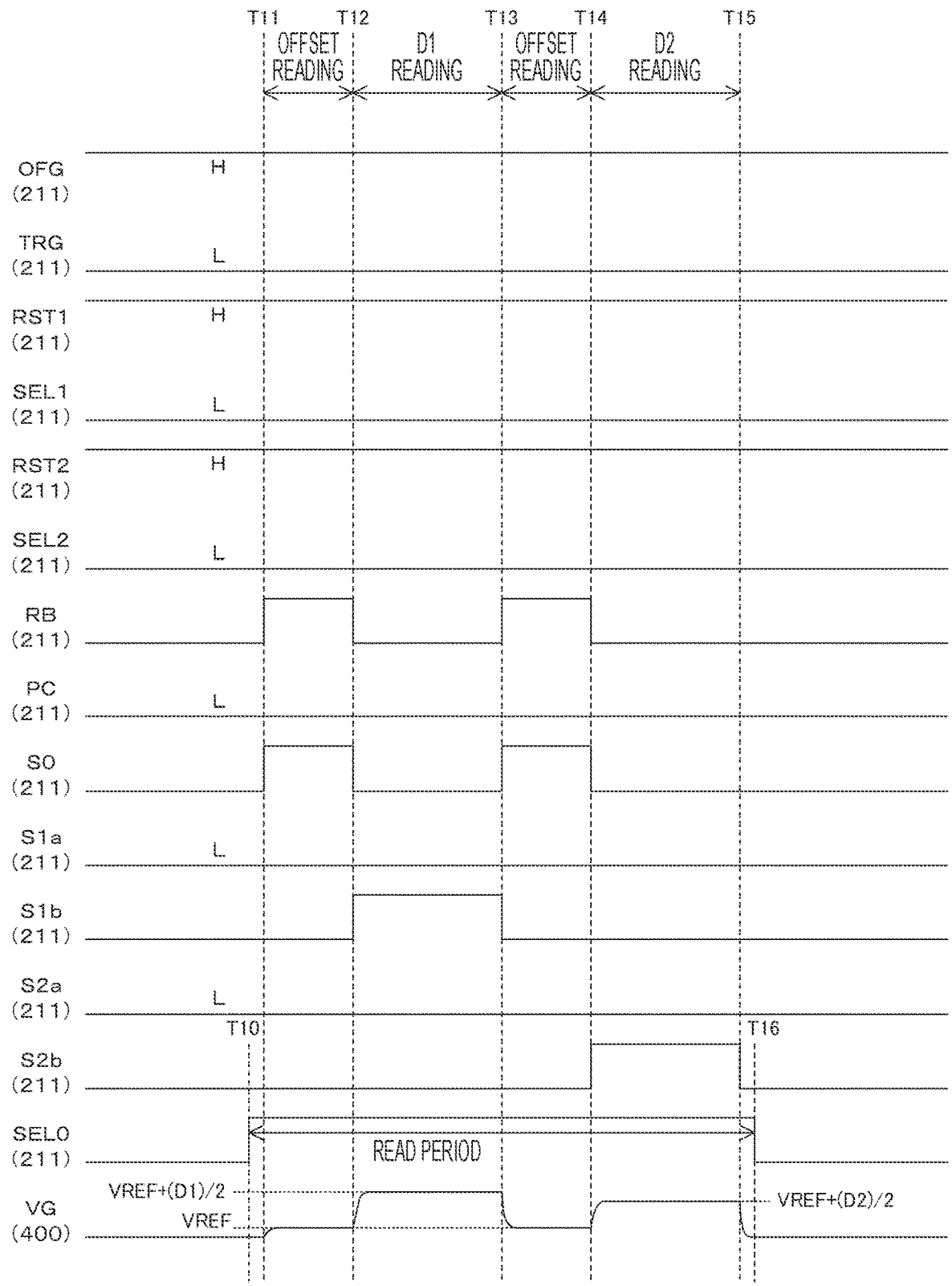
FIG. 11 is a timing chart illustrating an example of a read operation of the solid-state imaging element in the first embodiment of the present technology.

FIG. 11 is a timing chart illustrating an example of a read operation of the solid-state imaging element 200 in the first embodiment of the present technology. The read operation in the drawing is performed immediately after the analog CDS illustrated in FIGS. 7 and 10.

At timing T10 of the start of the read period, the vertical scanning circuit 211 sets the control signal SEL0 to the high level. Then, the vertical scanning circuit 211 sets the control signals RB and S0 to the high level over the period of timing T11 to timing T12. During this period, the voltage VG in the sample-and-hold circuit 400 becomes the reference voltage VREF, and the ADC 221 performs AD conversion (reading) of the reference voltage VREF by down counting. The reference voltage VREF is removed as an offset voltage by a subsequent circuit.

Subsequently, the vertical scanning circuit 211 sets the control signal S1b to the high level over the period of timing T12 to timing T13. During this period, the voltage VG becomes a level obtained by adding (D1)/2 to the reference voltage VREF, and the ADC 221 performs AD conversion (reading) of the level by up counting. Since the reference voltage VREF has been AD-converted by down counting, the reference voltage VREF is removed as an offset voltage by subsequent up counting. As a result, (D1)/2 is read by the ADC 221. In this manner, processing of removing the offset voltage of the digital signal can be referred to as digital CDS.

Note that the ADC 221 removes the reference voltage VREF (offset voltage) by down counting and up counting, but the present disclosure is not limited to this configuration. The ADC 221 may perform only the up counting or the down counting, and a subsequent circuit (the DSP circuit 120 or the like) may remove the offset voltage.

Then, the vertical scanning circuit 211 sets the control signals RB and S0 to the high level over the period of timing T13 to timing T14. During this period, the voltage VG in the sample-and-hold circuit 400 becomes the reference voltage VREF (offset voltage) again, and the ADC 221 reads the offset voltage by down counting.

Subsequently, the vertical scanning circuit 211 sets the control signal S2b to the high level over the period of timing T14 to timing T15. During this period, the voltage VG becomes a level obtained by adding (D2)/2 to the reference voltage VREF, and the ADC 221 reads the level by up counting. As a result, (D2)/2 is read. Then, at timing T16 of the end of the read period, the vertical scanning circuit 211 sets the control signal SEL0 to the low level.

The reading illustrated in the drawing is sequentially executed for each row of the SH shared block 300. One piece of image data is generated by reading all the rows.

Furthermore, processing of multiplying "(D1)/2" or "(D2)/2" by "2" to obtain D1 or D2 is executed by, for example, the DSP circuit 120 or the column signal processing circuit 220 in the subsequent stage. In a case where the column signal processing circuit 220 performs multiplication, a multiplication circuit is added in the column signal processing circuit 220.

FIG. 12 is a diagram for describing an operation of the sample-and-hold circuit 400 at the time of reading in the first embodiment of the present technology. In the drawing, the transistor is represented by a symbol of a switch, and the amplification transistor 463 and the selection transistor 464 are omitted. An arrow in the drawing indicates the direction of the potential when the reference voltage VREF is used as a reference.

As illustrated in a of the drawing, the short-circuit transistor 461 and the connection transistor 462 shift to the closed state immediately after the analog CDS. Accordingly, the voltage of the node on the output side of the common capacitor 450 becomes the reference voltage VREF. Note that the input node 350 is in a high impedance state at the time of reading.

Next, as illustrated in b of the drawing, after the short-circuit transistor 461 and the connection transistor 462 shift to the open state, the connection transistor 412 shifts to the closed state. Accordingly, the voltage of the node on the output side becomes a level obtained by adding (D1)/2 to the reference voltage VREF.

Then, as illustrated in c of the drawing, the short-circuit transistor 461 and the connection transistor 462 shift to the closed state. Accordingly, the voltage of the node on the output side of the common capacitor 450 becomes the reference voltage VREF again.

Next, as illustrated in d of the drawing, after the short-circuit transistor 461 and the connection transistor 462 shift to the open state, the connection transistor 422 shifts to the closed state. Accordingly, the voltage of the node on the output side becomes a level obtained by adding (D2)/2 to the reference voltage VREF.

Here, the circuit described in FIG. 3 of Patent Document 1 is assumed as a comparative example.

Figure 13:
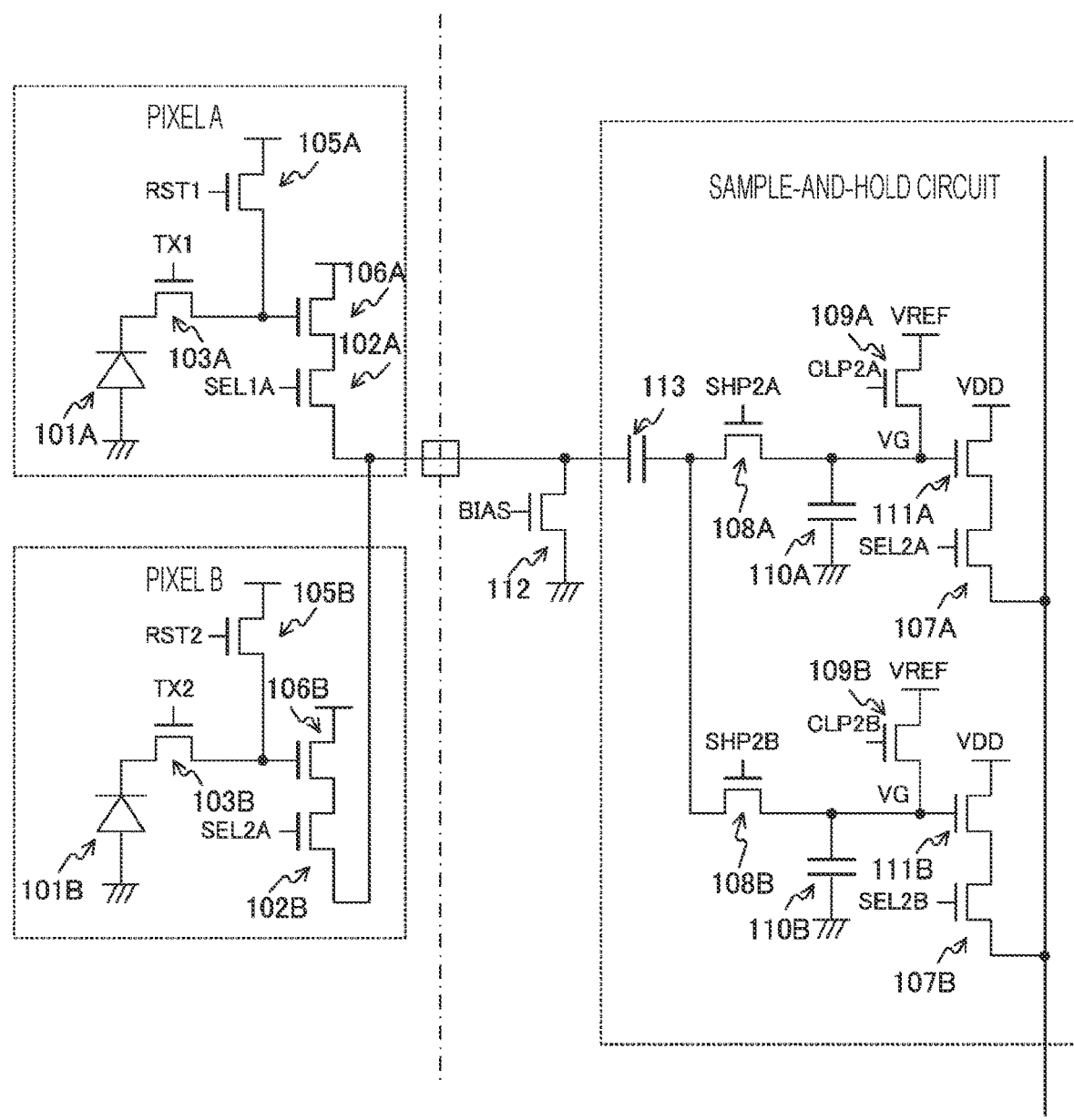
FIG. 13 is a circuit diagram illustrating a configuration example of an SH shared block in a comparative example.

FIG. 13 is a circuit diagram illustrating a configuration example of an SH shared block in a comparative example. In the SH shared block of the comparative example, pixels A and B share one sample-and-hold circuit. A reset signal RST1 and a transfer signal TX1 are input to the pixel A, and a reset signal RST2 and a transfer signal TX2 are input to the pixel B. That is, unlike the circuit illustrated in FIG. 4, an individual reset signal and transfer signal are input for each pixel.

Further, the sample-and-hold circuit of the comparative example includes capacitors 113, 110A, and 110B, and transistors 108A, 109A, 111A, 107A, 108B, 109B, 111B, and 107B.

A terminal on the input side of the capacitor 113 is commonly connected to the pixels A and B. The transistor 108A opens and closes a path between a terminal on the output side of the capacitor 113 and one end of the capacitor 110A. The transistor 109A opens and closes a path between the node of the reference voltage VREF and one end of the capacitor 110A. The transistor 111A amplifies the voltage at one end of the capacitor 110A, and the transistor 107A outputs the amplified voltage to the vertical signal line.

The transistor 108B opens and closes a path between the terminal on the output side of the capacitor 113 and one end of the capacitor 110B. The transistor 109B opens and closes a path between the node of the reference voltage VREF and one end of the capacitor 110B. The transistor 111B amplifies the voltage at one end of the capacitor 110B, and the transistor 107B outputs the amplified voltage to the vertical signal line.

Figure 14:
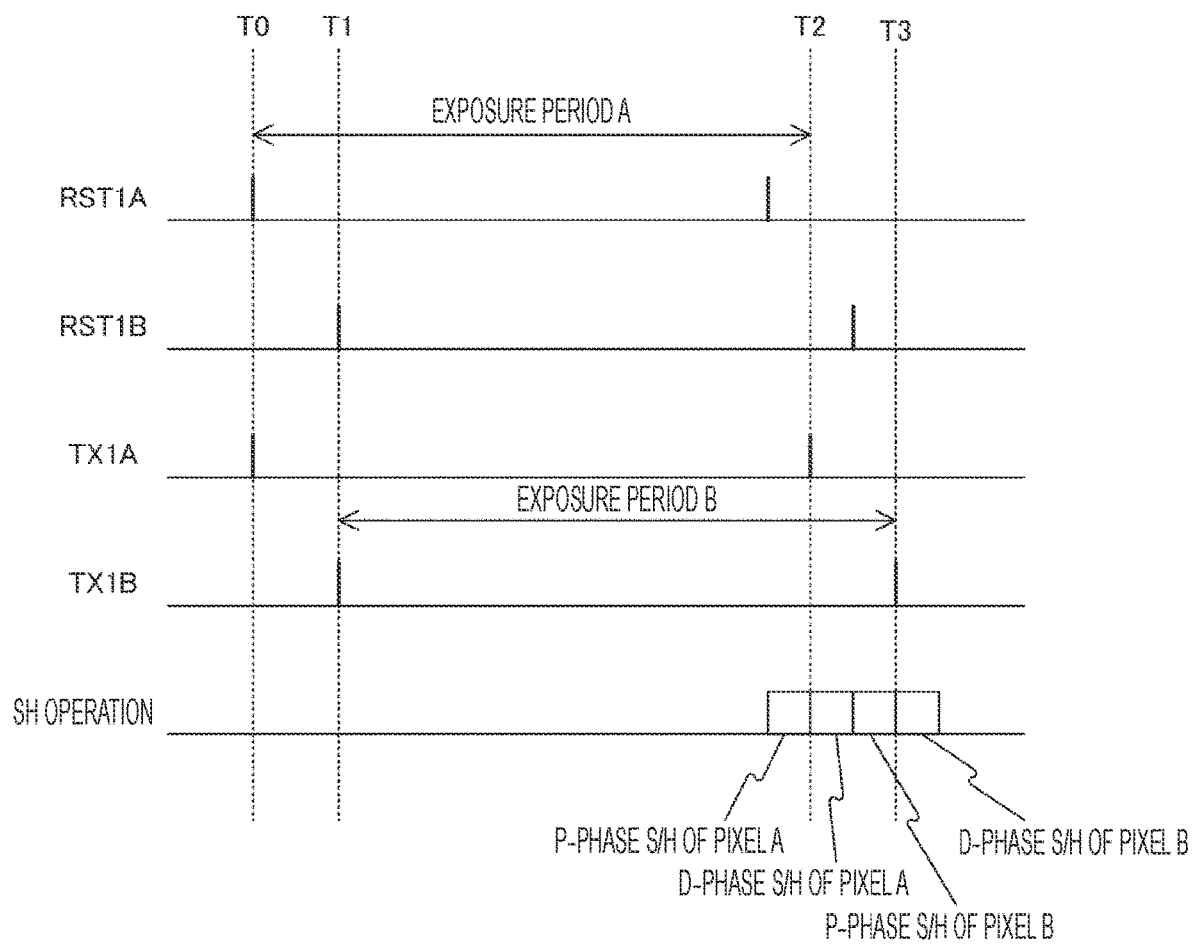
FIG. 14 is a timing chart illustrating an example of an operation of a solid-state imaging element in the comparative example.

FIG. 14 is a timing chart illustrating an example of an operation of a solid-state imaging element in a comparative example. This drawing is a simplified timing chart of FIG. 4 of Patent Document 1.

In the comparative example, after the P-phase level of the pixel A is sampled and held, the D-phase level of the pixel A is sampled and held. Next, the P-phase level of the pixel B is sampled and held, and then the D-phase level of the pixel B is sampled and held. Thus, in the comparative example, the sampling cannot be performed in the order of the P-phase level of the pixel A, the P-phase level of the pixel B, the D-phase level of the pixel A, and the D-phase level of the pixel B. This is because, in the circuit configuration illustrated in FIG. 13, the common capacitor 113 is used for the samples at the P-phase level of both the pixels A and B.

Then, in the comparative example, since it is necessary to perform the sampling in the order of the P-phase level of the pixel A, the D-phase level of the pixel A, the P-phase level of the pixel B, and the D-phase level of the pixel B, it is necessary to shift the timings of the start and end of the exposure of the pixels A and B. For example, an exposure period A of the pixel A starts at timing T0, and ends at timing T2. Furthermore, an exposure period B of the pixel B starts at timing T1, and ends at timing T3.

As illustrated in FIG. 14, in the comparative example, the timings of the start and end of the exposure of the pixels A and B do not match, resulting in an incomplete global shutter method at the time of exposure.

On the other hand, in the sample-and-hold circuit 400 illustrated in FIG. 4, the P-phase level of each of the pixels 310 and 320 is held in the individual capacitors 451 and 452, and the common capacitor 450 is not used. For this reason, the sample-and-hold circuit 400 can perform sampling in the order of the P-phase level of the pixel 310, the P-phase level of the pixel 320, the D-phase level of the pixel 310, and the D-phase level of the pixel 320. For this reason, the timings of the start and end of exposure of the pixels 310 and 320 can be completely matched.

Furthermore, in the comparative example, the level based on the reference voltage VREF is sampled at the end of exposure, and the level based on the reference voltage VREF is also read at the time of reading. For this reason, in a case where the reference voltage VREF has different values at the end of exposure and at the time of reading due to voltage fluctuation in a long period, an error occurs in the read digital signal. This error may deteriorate the PRNU.

On the other hand, in the sample-and-hold circuit 400 illustrated in FIG. 4, −(D2)/2 and −(D1)/2 that do not depend on the reference voltage VREF are held at the end of exposure. For this reason, even in a case where the reference voltage VREF is different between the end of exposure and the time of reading due to the voltage fluctuation in the long period, an error is less likely to occur in the digital signal. Accordingly, deterioration of the PRNU is suppressed.

The matching of the exposure timings and the suppression of the deterioration of the PRNUs described above can improve the image quality of the image data in the sample-and-hold circuit 400 illustrated in FIG. 4.

Thus, according to the first embodiment of the present technology, the sample-and-hold circuit 400 causes the individual capacitors 451 and 452 to hold the P-phase level, and causes the individual capacitors 451 and 452 and the common capacitor 450 to hold the level corresponding to the difference between the P-phase level and the D-phase level. Accordingly, the timings of the start and end of exposure of the pixels 310 and 320 can be completely matched, and deterioration of the PRNU can be suppressed. As a result, the image quality of the image data is improved.

2. Second Embodiment

In the first embodiment described above, the solid-state imaging element 200 sequentially reads the reference voltage (offset voltage), a sum value of (D1)/2 and the reference voltage, the reference voltage, and a sum value of (D2)/2 and the reference voltage for each row. However, in this reading method, the reading speed may be insufficient. A solid-state imaging element 200 of a second embodiment is different from that of the first embodiment in that the second reading of the reference voltage is omitted and the reading speed is increased.

Figure 15:
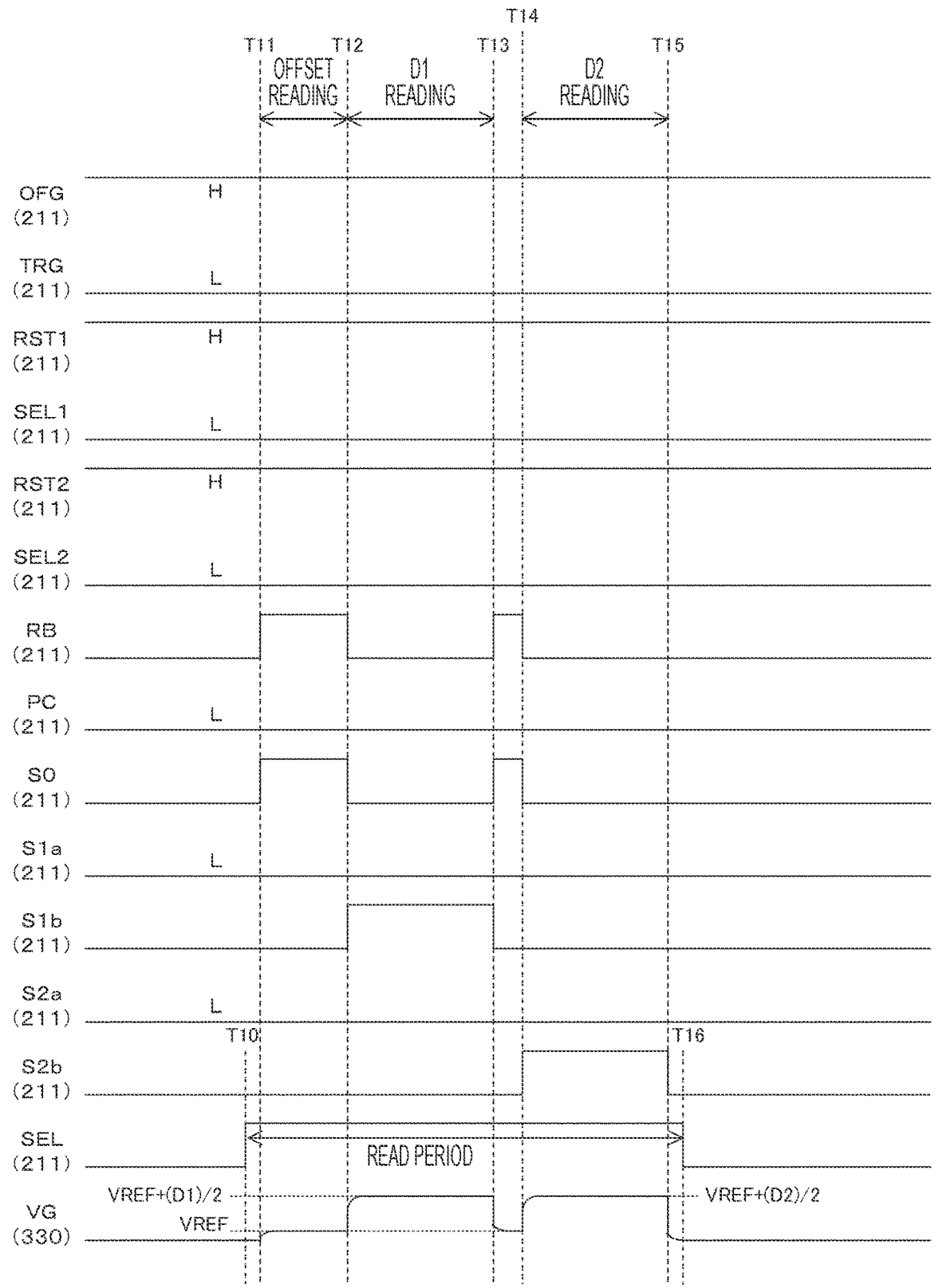
FIG. 15 is a timing chart illustrating an example of a read operation of a solid-state imaging element in a second embodiment of the present technology.

FIG. 15 is a timing chart illustrating an example of a read operation of the solid-state imaging element 200 in the second embodiment of the present technology. The solid-state imaging element 200 of the second embodiment is different from that of the first embodiment in that the second reading of the reference voltage (offset voltage) is omitted.

As illustrated in the drawing, the ADC 221 performs AD conversion (reading) of the reference voltage VREF (offset voltage) during a period from timing T11 to timing T12. The column signal processing circuit 220 holds the read reference voltage VREF. During the period from timing T12 to timing T13, the ADC 221 reads a sum value of the reference voltage VREF and (D1)/2 (D-phase level) of the pixel 310.

The vertical scanning circuit 211 sets the control signals RB and S0 to the high level over the period of timing T13 to timing T14. The ADC 221 does not perform reading during this period. Since the second reading of the reference voltage is omitted, the period between timing T13 to timing T14 of the second embodiment is set to a period shorter than the period required for AD conversion.

Then, during the period from timing T15 to timing T16, the ADC 221 reads a sum value of the reference voltage VREF and (D2)/2 of the pixel 320. The column signal processing circuit 220 uses the held reference voltage VREF at the time of digital CDS of the pixel 320.

As illustrated in the drawing, by omitting the second reading of the reference voltage for each row, the reading speed can be increased.

Hereinafter, the reading of the first embodiment is referred to as "PDPD reading", and the reading of the second embodiment is referred to as "PDD reading".

Figure 16:
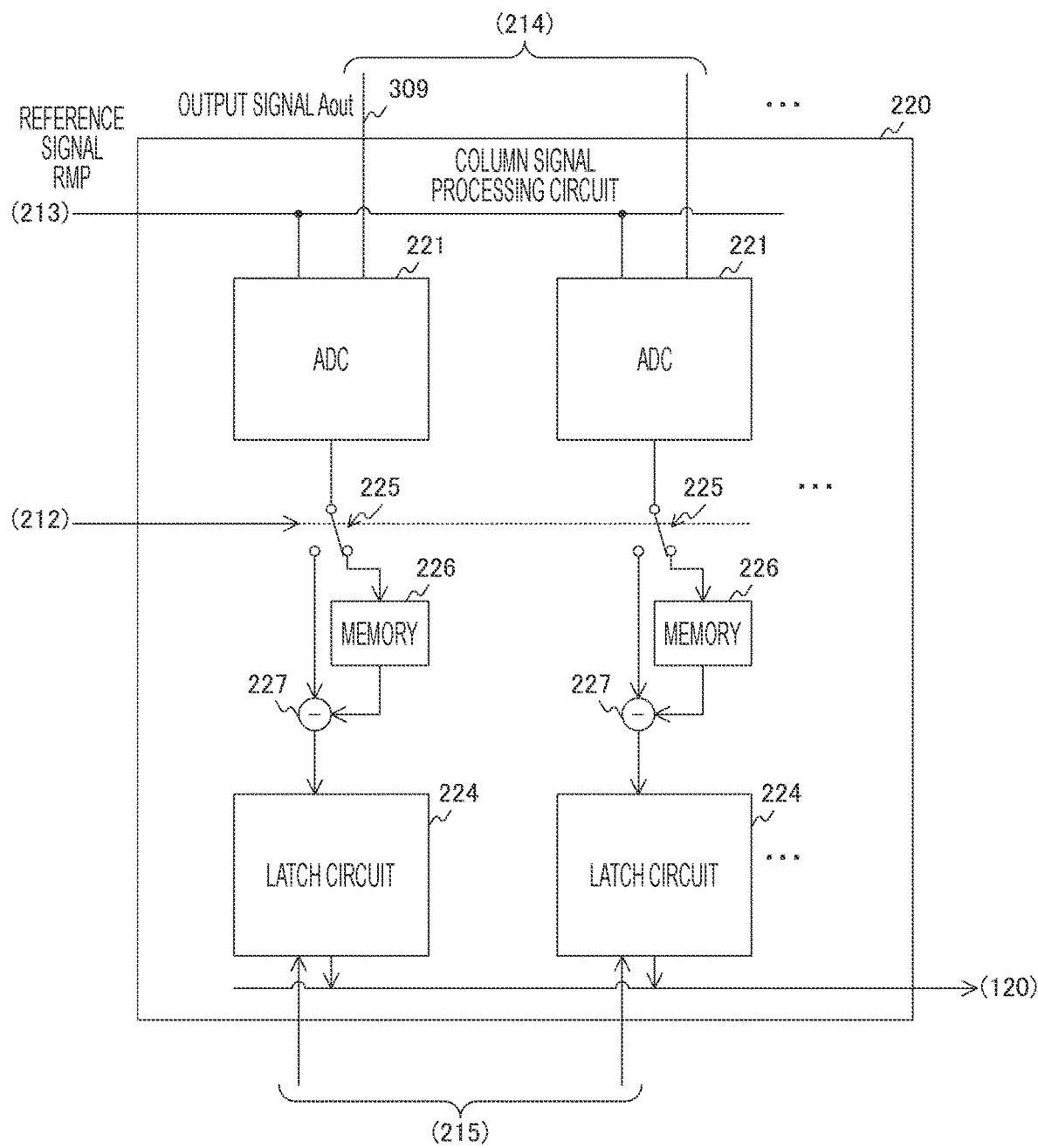
FIG. 16 is a block diagram illustrating a configuration example of a column signal processing circuit in the second embodiment of the present technology.

FIG. 16 is a block diagram illustrating a configuration example of the column signal processing circuit 220 in the second embodiment of the present technology. The column signal processing circuit 220 of the second embodiment is different from that of the first embodiment in that it further includes a selector 225, a memory 226, and a subtractor 227 for each column.

The selector 225 outputs the digital signal from the ADC 221 to either the subtractor 227 or the memory 226 under the control of the timing control circuit 212. The memory 226 holds a digital signal. The subtractor 227 obtains a difference between the digital signal from the selector 225 and the digital signal held in the memory 226, and outputs the difference to the latch circuit 224.

The timing control circuit 212 controls the selector 225 to output the reference voltage VREF of the pixel 310 to the memory 226. The memory 226 holds the reference voltage VREF. Then, the timing control circuit 212 controls the selector 225 to output a sum value of the reference voltage VREF and (D1)/2 to the subtractor 227. Furthermore, the timing control circuit 212 controls the selector 225 to output a sum value of the reference voltage VREF and (D2)/2 to the subtractor 227.

Note that the digital CDS processing of the circuit including the selector 225, the memory 226, and the subtractor 227 can be executed by a subsequent circuit (such as the DPS circuit 120) instead of the column signal processing circuit 220.

In this way, according to the second embodiment of the present technology, since the ADC 221 omits the second reading of the reference voltage (offset voltage), the reading speed can be increased.

3. Third Embodiment

In the first embodiment described above, two pixels share one sample-and-hold circuit 400, but the number of pixels sharing the sample-and-hold circuit 400 is not limited to two pixels. A solid-state imaging element 200 of a third embodiment is different from that of the first embodiment in that four pixels share one sample-and-hold circuit 400.

Figure 17:
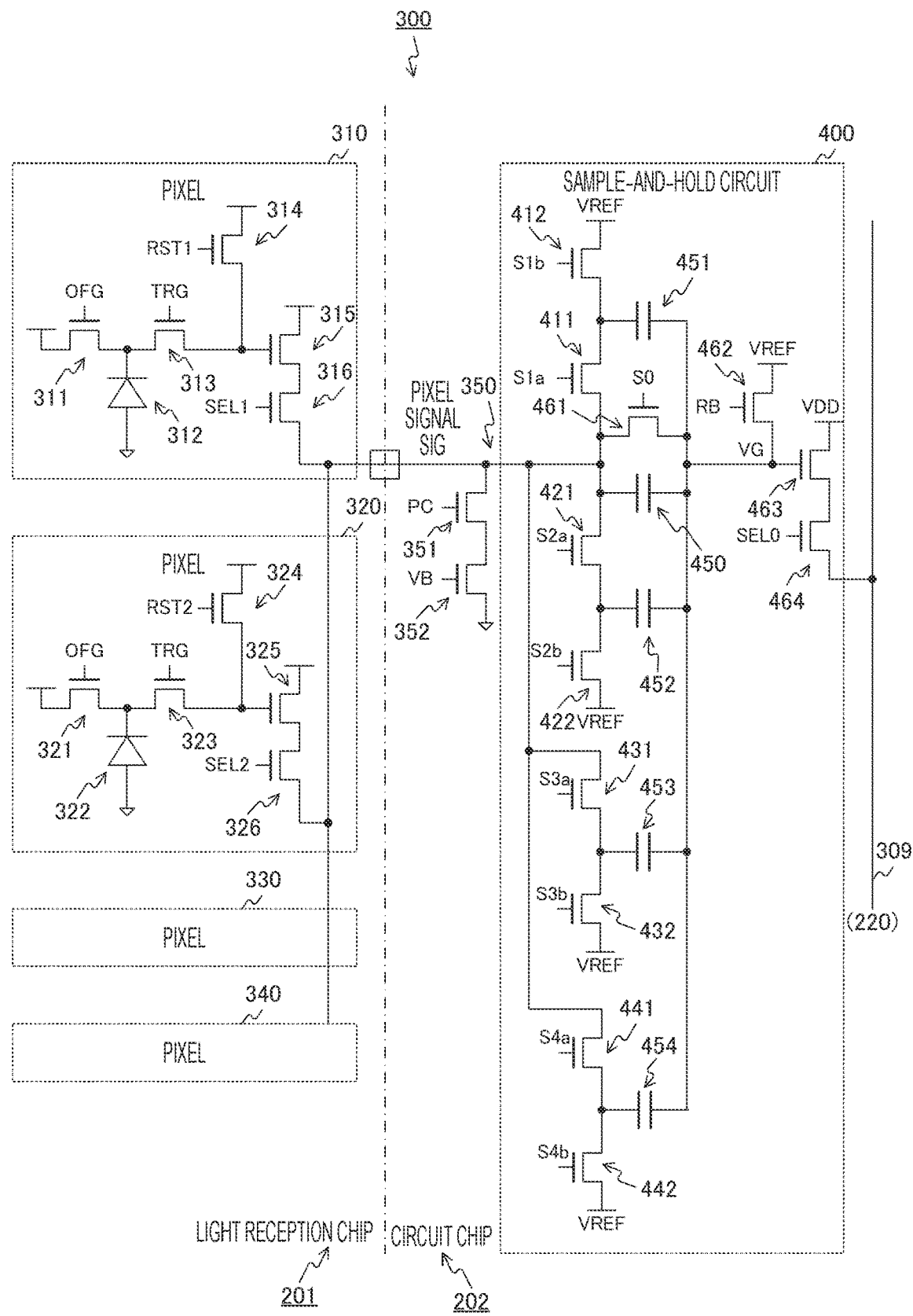
FIG. 17 is a circuit diagram illustrating a configuration example of an SH shared block in a third embodiment of the present technology.

FIG. 17 is a circuit diagram illustrating a configuration example of the SH shared block 300 in the third embodiment of the present technology. The SH shared block 300 of the third embodiment is different from that of the first embodiment in that it further includes pixels 330 and 340, short-circuit transistors 431 and 441, connection transistors 432 and 442, and individual capacitors 453 and 454.

The circuit configuration of each of the pixels 330 and 340 is similar to that of the pixels 310 and 320. These four pixels are arranged in, for example, 2 rows×2 columns.

One end (right side in the drawing) of each of the individual capacitors 453 and 454 is connected to the output-side node 405.

The short-circuit transistor 431 opens and closes a path between the other end (left side in the drawing) of the individual capacitor 453 and the input node 350 according to a control signal S3a from the vertical scanning circuit 211. The short-circuit transistor 441 opens and closes a path between the other end (left side in the drawing) of the individual capacitor 454 and the input node 350 according to a control signal S4a from the vertical scanning circuit 211.

The connection transistor 432 opens and closes a path between a node of a reference voltage VREF and the other end of the individual capacitor 453 according to a control signal S3b from the vertical scanning circuit 211. The connection transistor 442 opens and closes a path between a node of a reference voltage VREF and the other end of the individual capacitor 454 according to a control signal S4b from the vertical scanning circuit 211.

As illustrated in the drawing, by sharing one sample-and-hold circuit by four pixels, the number of elements per pixel can be reduced as compared with the first embodiment in which two pixels share one sample-and-hold circuit.

Note that more than four pixels (eight pixels) can also share one sample-and-hold circuit. In this case, transistors corresponding to the short-circuit transistor 411 and the connection transistor 412 and an individual capacitor are added for each pixel. If the number of pixels to be shared is N (N is an integer), the number $M_1$ of capacitors in the sample-and-hold circuit 400 is expressed by the following equation.

$$M_1 = N+1 \qquad \text{Equation 1}$$

Furthermore, the number $M_2$ of transistors in the sample-and-hold circuit 400 is expressed by the following equation.

$$M_2 = 2N+4 \qquad \text{Equation 2}$$

Furthermore, the number $M_3$ of control signals (Sla and the like) to the sample-and-hold circuit 400 is expressed by the following equation.

$$M_3 = 2N+3 \qquad \text{Equation 3}$$

Figure 18:
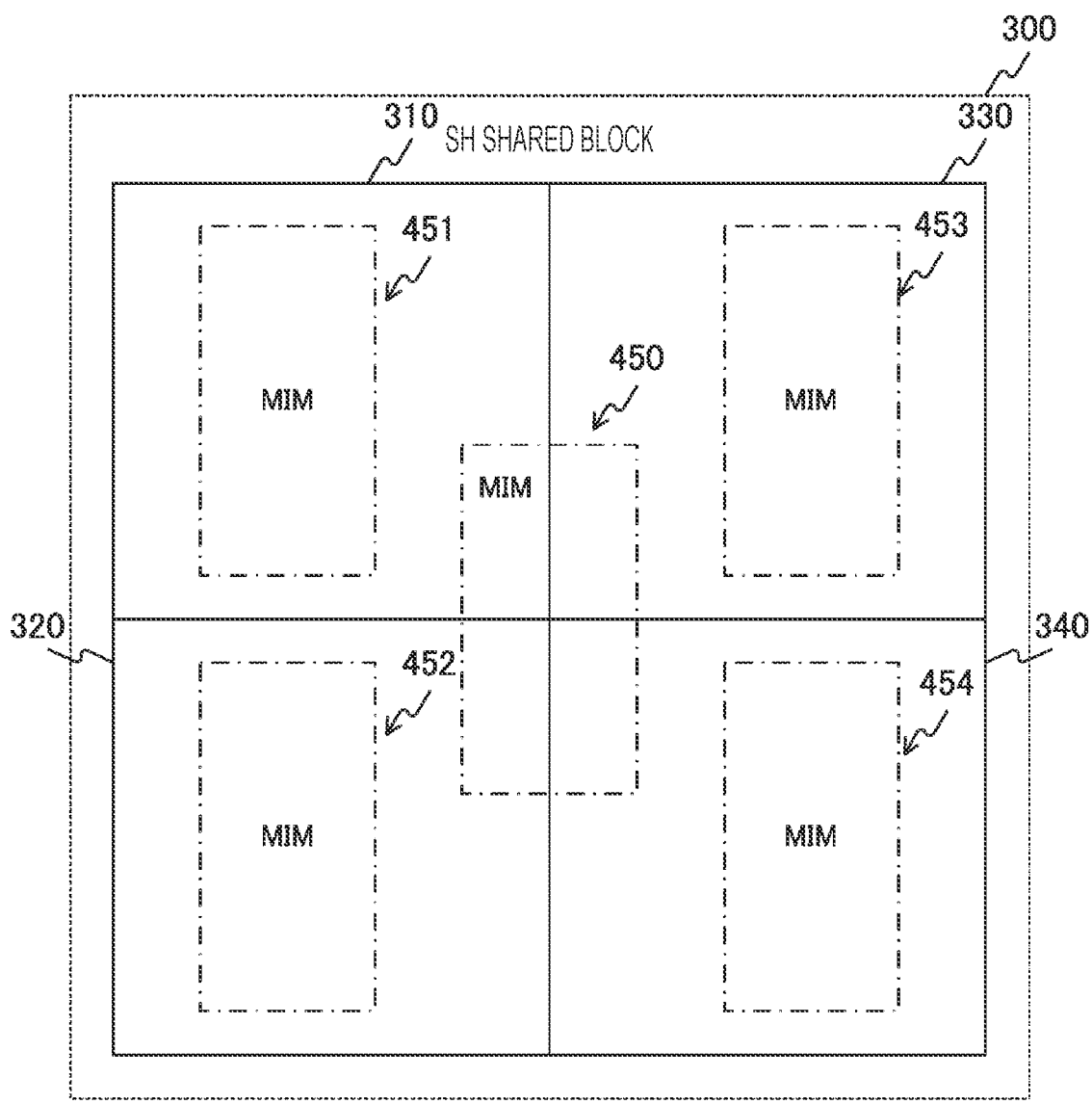
FIG. 18 is a diagram illustrating an arrangement example of MIM elements in the third embodiment of the present technology.

FIG. 18 is a diagram illustrating an arrangement example of MIM elements in the third embodiment of the present technology. In the SH shared block 300, five MIM elements are disposed as a common capacitor 450 and individual capacitors 451 to 454. With the circuit chip 202 as a lower chip, the individual capacitors 451 to 454 are disposed immediately below the corresponding pixels. Furthermore, the common capacitor 450 is disposed between the individual capacitors 451 to 454 (for example, the central portion of 2 rows×2 columns).

Note that the second embodiment can also be applied to the third embodiment. In this case, the second, third, and fourth reading of the reference voltage is omitted. Similarly, in a case where the number of pixels to be shared is larger than four, reading of the reference voltage from the second time onwards is omitted.

Thus, according to the third embodiment of the present technology, since four pixels share one sample-and-hold circuit 400, the number of elements per pixel can be reduced as compared with a case where two pixels share one sample-and-hold circuit 400.

Next, respective features of the comparative example and the above-described first to third embodiments will be described.

FIG. 19 is a diagram for describing features of the comparative example and the sample-and-hold circuit 400 in the embodiment of the present technology. The number of capacitors in the sample-and-hold circuit of the comparative example is expressed by Equation 1. In addition, the number of transistors in the sample-and-hold circuit of the comparative example is 4N. On the other hand, in the sample-and-hold circuit 400, the number of capacitors is the same as that in the comparative example. The number of transistors is expressed by Equation 2.

Comparing the number of transistors, in a case where N is 3 or more, the number of transistors in the sample-and-hold circuit 400 is smaller than that in the comparative example.

Also, the number of control signals of the comparative example is 3N. On the other hand, in the sample-and-hold circuit 400, the number of control signals is expressed by Equation 3. Comparing the number of control signals, in a case where N is 3 or more, the number of control signals in the sample-and-hold circuit 400 is smaller than that in the comparative example. For this reason, the number of signal lines for transmitting control signals can be reduced as compared with the comparative example.

In addition, the transmission gain of the sample-and-hold circuit 400 is equivalent to that of the comparative example. Furthermore, as described above, in the comparative example, the start and end timings of the exposure of each of the plurality of pixels sharing the sample-and-hold circuit do not match. On the other hand, the start and end timings of the exposure of the plurality of pixels sharing the sample-and-hold circuit 400 match.

In addition, as described above, in the comparative example, voltage fluctuation tolerance in a long period is weak. On the other hand, in the sample-and-hold circuit 400, voltage fluctuation tolerance in a long period is strong. Furthermore, in the comparative example, PDPD reading is possible, but PDD reading is not possible. On the other hand, in a case where the sample-and-hold circuit 400 is used, both the PDPD reading and the PDD reading are possible.

4. Example of Application to Mobile Body

The technology according to the present disclosure (the present technology) can be applied to various products. For example, the technology according to the present disclosure may also be realized as a device mounted on any type of mobile body such as an automobile, an electric vehicle, a hybrid electric vehicle, a motorcycle, a bicycle, a personal mobility, an airplane, a drone, a ship, and a robot.

Figure 20:
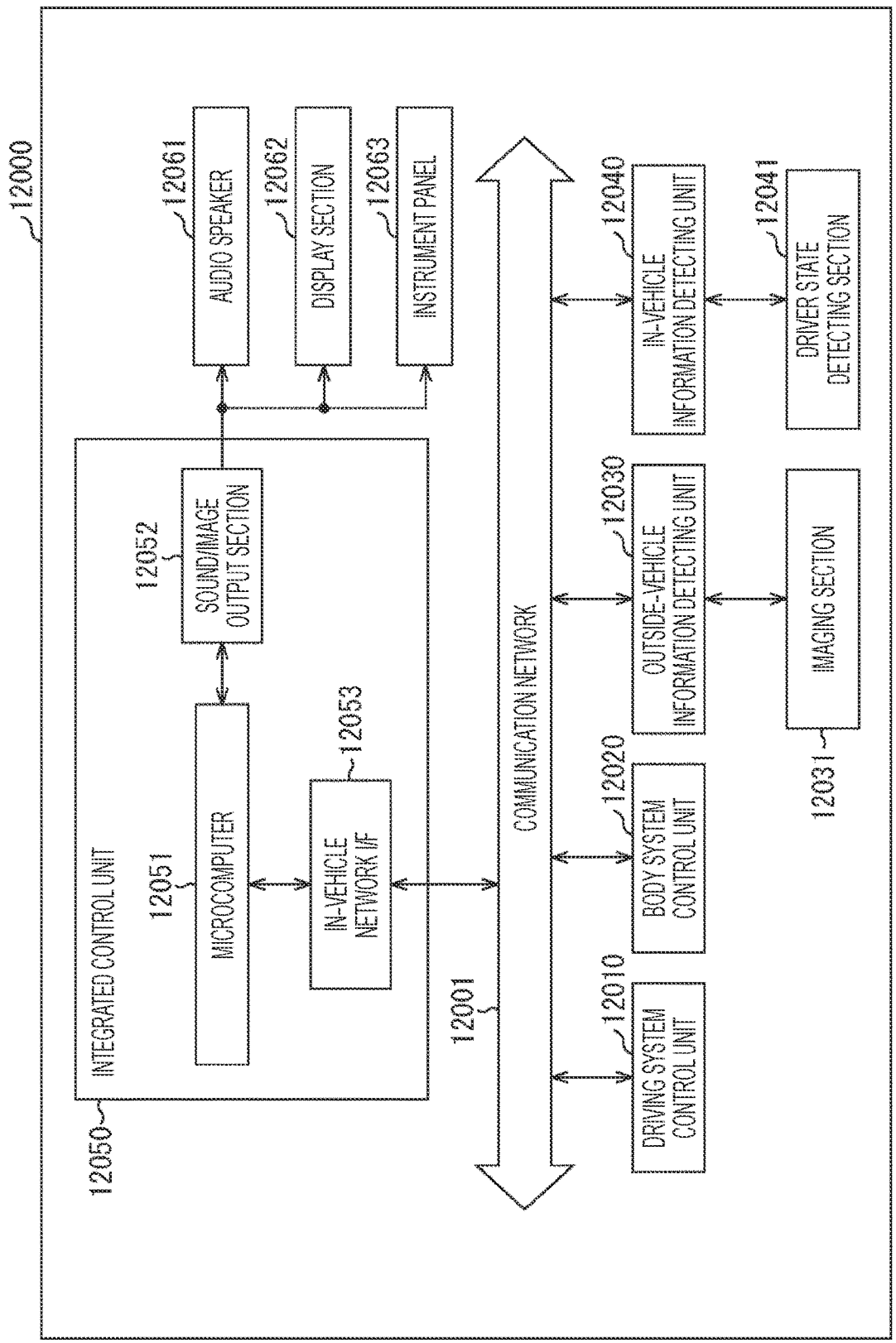
FIG. 20 is a block diagram illustrating a schematic configuration example of a vehicle control system.

FIG. 20 is a block diagram illustrating a schematic configuration example of a vehicle control system which is an example of a mobile body control system to which the technology according to the present disclosure can be applied.

The vehicle control system 12000 includes a plurality of electronic control units connected to each other via a communication network 12001. In the example illustrated in FIG. 20, the vehicle control system 12000 includes a driving system control unit 12010, a body system control unit 12020, an outside-vehicle information detecting unit 12030, an in-vehicle information detecting unit 12040, and an integrated control unit 12050. Furthermore, as a functional configuration of the integrated control unit 12050, a microcomputer 12051, a sound/image output section 12052, and an in-vehicle network interface (I/F) 12053 are illustrated.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of information regarding the outside of the vehicle, the information being acquired by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 20, an audio speaker 12061, a display section 12062, and an instrument panel 12063 are illustrated as the output device. The display section 12062 may, for example, include at least one of an on-board display and a head-up display.

Figure 21:
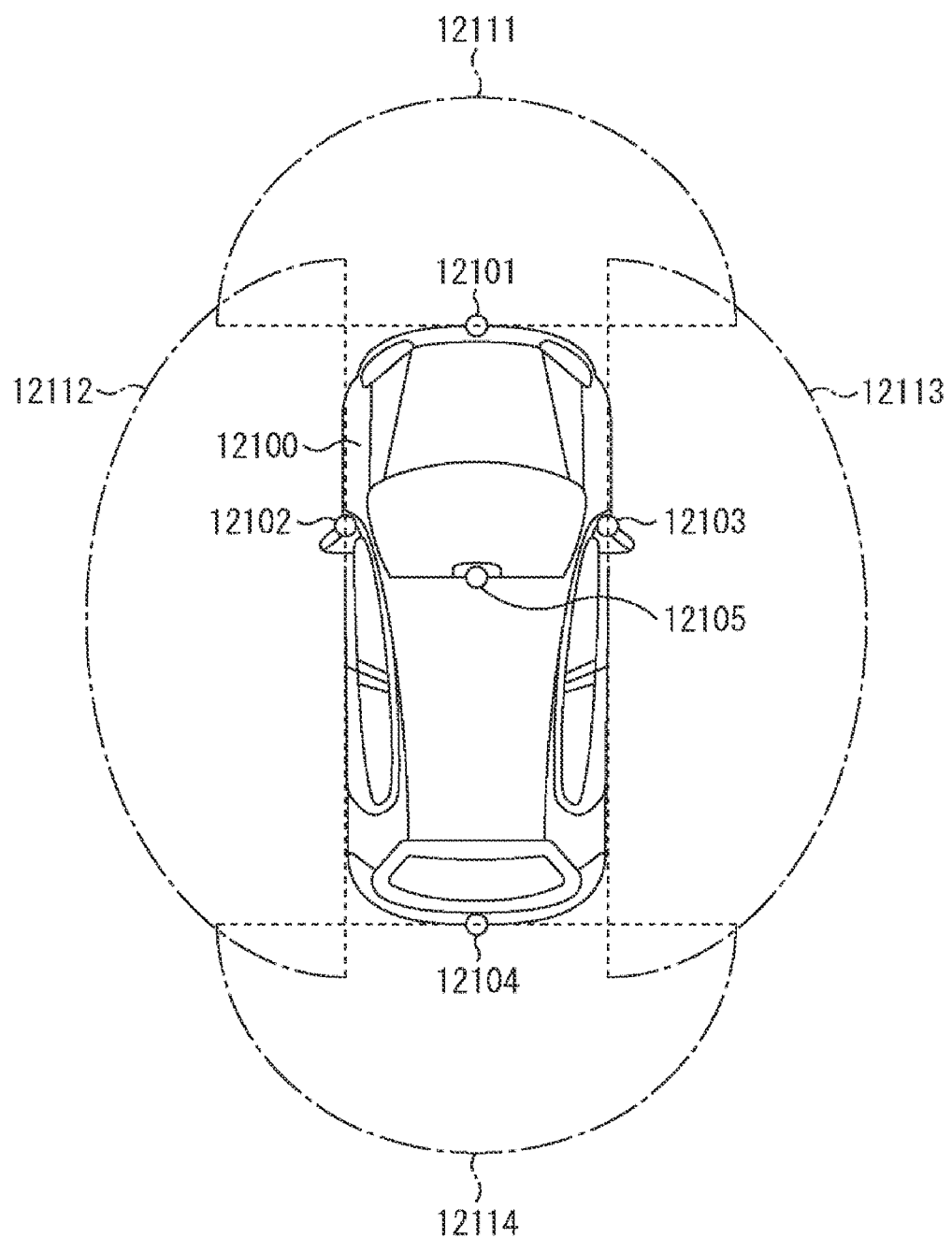
FIG. 21 is an explanatory view illustrating an example of an installation position of an imaging section.

FIG. 21 is a diagram illustrating an example of the installation position of the imaging section 12031.

In FIG. 21, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 21 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure may be applied to the imaging section 12031, for example, out of the configurations described above. Specifically, the imaging device in FIG. 1 can be applied to the imaging section 12031. By applying the technology according to the present disclosure to the imaging section 12031, a more easily viewable captured image can be obtained, by which fatigue of the driver can be reduced.

Note that the embodiments described above are examples for embodying the present technology, and the matters in the embodiments and the matters used to specify the invention in the claims have a corresponding relationship. Similarly, there is a correspondence relationship between the matters specifying the invention in claims and the matters in the embodiments of the present technology having the same names. However, the present technology is not limited to the embodiments, and can be embodied by applying various modifications to the embodiments without departing from the gist thereof.

Note that, the effect described in the present specification is illustrative only and is not limitative; there may also be another effect.

Note that the present technology may also have a following configuration.

(1) A solid-state imaging element including:
a first pixel that generates a predetermined first reset level and a first signal level according to an exposure amount;
a second pixel that generates a predetermined second reset level and a second signal level according to an exposure amount; and
a sample-and-hold circuit that performs reset level sampling processing and correlated double sampling processing, the reset level sampling processing causing a first individual capacitor to hold the first reset level and causing a second individual capacitor to hold the second reset level, the correlated double sampling processing causing a common capacitor and the first individual capacitor to hold a first output level according to a difference between the first reset level and the first signal level and causing the common capacitor and the second individual capacitor to hold a second output level according to a difference between the second reset level and the second signal level.

(2) The solid-state imaging element according to (1), in which the sample-and-hold circuit includes:
the first individual capacitor;
the second individual capacitor;
the common capacitor;
a reset level sampling circuit that performs the reset level sampling processing; and
a correlated double sampling circuit that performs the correlated double sampling processing.

(3) The solid-state imaging element according to (2) above,
in which one ends of the first individual capacitor, the second individual capacitor, and the common capacitor are commonly connected to a predetermined output-side node,
another end of the common capacitor is commonly connected to the first and second pixels, and
the reset level sampling circuit includes:
a first connection transistor that connects a node of a predetermined reference voltage to another end of the first individual capacitor;
a second connection transistor that connects a node of the reference voltage to another end of the second individual capacitor; and
a common short-circuit transistor that short-circuits both ends of the common capacitor.

(4) The solid-state imaging element according to (3) above,
in which the correlated double sampling circuit includes:
a common connection transistor that connects a node of the reference voltage to the output-side node;
a first short-circuit transistor that short-circuits between the another end of the first individual capacitor and the another end of the common capacitor; and
a second short-circuit transistor that short-circuits between the another end of the second individual capacitor and the another end of the common capacitor.

(5) The solid-state imaging element according to any one of (1) to (4) above, further including an analog-to-digital converter,
in which the sample-and-hold circuit further performs, after the correlated double sampling processing, processing of sequentially outputting the reference voltage, a sum value of the reference voltage and the first output level, the reference voltage, and a sum value of the reference voltage and the second output level to the analog-to-digital converter.

(6) The solid-state imaging element according to (5) above, in which the analog-to-digital converter sequentially converts the reference voltage, a sum value of the reference voltage and the first output level, the reference voltage, and a sum value of the reference voltage and the second output level into a digital signal.

(7) The solid-state imaging element according to (5) above, in which the analog-to-digital converter sequentially converts the reference voltage, a sum value of the reference voltage and the first output level, and a sum value of the reference voltage and the second output level into a digital signal.

(8) The solid-state imaging element according to any one of (1) to (7) above, further including:
a third pixel that generates a predetermined third reset level and a third signal level according to an exposure amount; and
a fourth pixel that generates a predetermined fourth reset level and a fourth signal level according to an exposure amount,
in which the sample-and-hold circuit causes a third individual capacitor to hold the third reset level and causes a fourth individual capacitor to hold the fourth reset level in the reset level sampling processing, and causes the common capacitor and the third individual capacitor to hold a third output level according to a difference between the third reset level and the fourth signal level and causes the common capacitor and the fourth individual capacitor to hold a fourth output level according to a difference between the fourth reset level and the fourth signal level in the correlated double sampling processing.

(9) An imaging device including:
a first pixel that generates a predetermined first reset level and a first signal level according to an exposure amount;
a second pixel that generates a predetermined second reset level and a second signal level according to an exposure amount;
a sample-and-hold circuit that performs reset level sampling processing and correlated double sampling processing, the reset level sampling processing causing a first individual capacitor to hold the first reset level and causing a second individual capacitor to hold the second reset level, the correlated double sampling processing causing a common capacitor and the first individual capacitor to hold a first output level according to a difference between the first reset level and the first signal level and causing the common capacitor and the second individual capacitor to hold a second output level according to a difference between the second reset level and the second signal level; and
a column signal processing circuit that converts a level output from the sample-and-hold circuit into a digital signal.

(10) A method for controlling a solid-state imaging element, the method including:
a reset level sampling step of causing a first individual capacitor to hold a predetermined first reset level and causing a second individual capacitor to hold a predetermined second reset level; and
a sample-and-hold step of performing correlated double sampling processing of causing a common capacitor and the first individual capacitor to hold a first output level according to a difference between the first reset level and a first signal level according to an exposure amount and causing the common capacitor and the second individual capacitor to hold a second output level according to a difference between the second reset level and a second signal level according to an exposure amount.

REFERENCE SIGNS LIST

100 Imaging device
107A, 108A, 109A, 111A, 107B, 108B, 109B, 111B Transistor
110 Optical unit
110A, 110B, 113 Capacitor
120 DSP circuit
130 Display unit
140 Operation unit
150 Bus
160 Frame memory
170 Storage unit
180 Power supply unit
200 Solid-state imaging element
201 Light reception chip
202 Circuit chip
211 Vertical scanning circuit
212 Timing control circuit
213 DAC
214 Pixel array unit
215 Horizontal transfer scanning circuit
220 Column signal processing circuit
221 ADC
222 Comparator
223 Counter
224 Latch circuit
225 Selector
226 Memory
227 Subtractor
300 SH shared block
310, 320, 330, 340 Pixel
311, 321 Charge discharge transistor
312, 322 Photoelectric conversion element
313, 323 Transfer transistor
314, 324 Reset transistor
315, 325, 463 Amplification transistor
316, 326, 464 Selection transistor
351, 412, 422, 432, 442, 462 Connection transistor
352 Load MOS transistor
400 Sample-and-hold circuit
411, 421, 431, 441, 461 Short-circuit transistor
450 Common capacitor
451, 452, 453, 454 Individual capacitor
12031 Imaging section

The invention claimed is:

1. A solid-state imaging element comprising:
a first pixel that generates a predetermined first reset level and a first signal level according to an exposure amount;
a second pixel that generates a predetermined second reset level and a second signal level according to an exposure amount; and
a sample-and-hold circuit that performs reset level sampling processing and correlated double sampling processing, the reset level sampling processing causing a first individual capacitor to hold the first reset level and causing a second individual capacitor to hold the second reset level, the correlated double sampling processing causing a common capacitor and the first individual capacitor to hold a first output level according to a difference between the first reset level and the first signal level and causing the common capacitor and the second individual capacitor to hold a second output level according to a difference between the second reset level and the second signal level.

2. The solid-state imaging element according to claim 1, wherein the sample-and-hold circuit includes:
the first individual capacitor;
the second individual capacitor;
the common capacitor;
a reset level sampling circuit that performs the reset level sampling processing; and
a correlated double sampling circuit that performs the correlated double sampling processing.

3. The solid-state imaging element according to claim 2, wherein one ends of the first individual capacitor, the second individual capacitor, and the common capacitor are commonly connected to a predetermined output-side node,
another end of the common capacitor is commonly connected to the first and second pixels, and
the reset level sampling circuit includes:
a first connection transistor that connects a node of a predetermined reference voltage to another end of the first individual capacitor;
a second connection transistor that connects a node of the reference voltage to another end of the second individual capacitor; and a common short-circuit transistor that short-circuits both ends of the common capacitor.

4. The solid-state imaging element according to claim 3, wherein the correlated double sampling circuit includes:
a common connection transistor that connects a node of the reference voltage to the output-side node;
a first short-circuit transistor that short-circuits between the another end of the first individual capacitor and the another end of the common capacitor; and
a second short-circuit transistor that short-circuits between the another end of the second individual capacitor and the another end of the common capacitor.

5. The solid-state imaging element according to claim 1, further comprising an analog-to-digital converter,
wherein the sample-and-hold circuit further performs, after the correlated double sampling processing, processing of sequentially outputting the reference voltage, a sum value of the reference voltage and the first output level, the reference voltage, and a sum value of the reference voltage and the second output level to the analog-to-digital converter.

6. The solid-state imaging element according to claim 5, wherein the analog-to-digital converter sequentially converts the reference voltage, a sum value of the reference voltage and the first output level, the reference voltage, and a sum value of the reference voltage and the second output level into a digital signal.

7. The solid-state imaging element according to claim 5, wherein the analog-to-digital converter sequentially converts the reference voltage, a sum value of the reference voltage and the first output level, and a sum value of the reference voltage and the second output level into a digital signal.

8. The solid-state imaging element according to claim 1, further comprising:
a third pixel that generates a predetermined third reset level and a third signal level according to an exposure amount; and
a fourth pixel that generates a predetermined fourth reset level and a fourth signal level according to an exposure amount,
wherein the sample-and-hold circuit causes a third individual capacitor to hold the third reset level and causes a fourth individual capacitor to hold the fourth reset level in the reset level sampling processing, and causes the common capacitor and the third individual capacitor to hold a first output level according to a difference between the third reset level and the fourth signal level and causes the common capacitor and the fourth individual capacitor to hold a fourth output level according to a difference between the fourth reset level and the fourth signal level in the correlated double sampling processing.

9. An imaging device comprising:
a first pixel that generates a predetermined first reset level and a first signal level according to an exposure amount;
a second pixel that generates a predetermined second reset level and a second signal level according to an exposure amount;
a sample-and-hold circuit that performs reset level sampling processing and correlated double sampling processing, the reset level sampling processing causing a first individual capacitor to hold the first reset level and causing a second individual capacitor to hold the second reset level, the correlated double sampling processing causing a common capacitor and the first individual capacitor to hold a first output level according to a difference between the first reset level and the first signal level and causing the common capacitor and the second individual capacitor to hold a second output level according to a difference between the second reset level and the second signal level; and
a column signal processing circuit that converts a level output from the sample-and-hold circuit into a digital signal.

10. A method for controlling a solid-state imaging element, the method comprising:
a reset level sampling step of causing a first individual capacitor to hold a predetermined first reset level and causing a second individual capacitor to hold a predetermined second reset level; and
a sample-and-hold step of performing correlated double sampling processing of causing a common capacitor and the first individual capacitor to hold a first output level according to a difference between the first reset level and a first signal level according to an exposure amount and causing the common capacitor and the second individual capacitor to hold a second output level according to a difference between the second reset level and a second signal level according to an exposure amount.

* * * * *